United States Patent
Mihara et al.

(10) Patent No.: US 8,294,752 B2
(45) Date of Patent: Oct. 23, 2012

(54) IMAGE SYSTEM, IMAGE DISPLAY DEVICE AND IMAGE VIEWING EYEGLASSES WITH THEM

(75) Inventors: Kazuhiro Mihara, Osaka (JP); Hiroshi Miyai, Hyogo (JP); Katsuo Saigo, Hyogo (JP); Masafumi Shimotashiro, Osaka (JP); Seiji Nakazawa, Osaka (JP); Masayuki Kozuka, Osaka (JP); Yoshiho Gotoh, Osaka (JP)

(73) Assignee: Panasonic Corporation, Osaka (JP)

( * ) Notice: Subject to any disclaimer, the term of this patent is extended or adjusted under 35 U.S.C. 154(b) by 664 days.

(21) Appl. No.: 12/567,291

(22) Filed: Sep. 25, 2009

(65) Prior Publication Data
US 2010/0328439 A1    Dec. 30, 2010

Related U.S. Application Data

(60) Provisional application No. 61/220,897, filed on Jun. 26, 2009.

(30) Foreign Application Priority Data
Jul. 2, 2009 (JP) .................................. 2009-157937

(51) Int. Cl.
*H04N 15/00* (2006.01)
(52) U.S. Cl. ................ 348/53; 348/46; 348/56
(58) Field of Classification Search ............. 348/46, 348/51
See application file for complete search history.

(56) References Cited

U.S. PATENT DOCUMENTS
2001/0043266 A1* 11/2001 Robinson et al. ............ 348/53
2007/0139617 A1* 6/2007 DeCusatis et al. ........... 353/7
2009/0109282 A1* 4/2009 Schnebly et al. ............ 348/55
2010/0149320 A1* 6/2010 MacNaughton et al. ..... 348/51
2011/0164122 A1* 7/2011 Hardacker ................... 348/53
2011/0255160 A1* 10/2011 Lee et al. .................... 359/464

FOREIGN PATENT DOCUMENTS
JP        11-98538      4/1999
JP      2000-36969     2/2000

\* cited by examiner

*Primary Examiner* — Michael Won
(74) *Attorney, Agent, or Firm* — Wenderoth, Lind & Ponack, L.L.P.

(57) ABSTRACT

An image system comprises an image display device which displays images, and image viewing eyeglasses used for viewing images displayed by the image display device. The image display device comprises an image display device configured to display image; and image viewing eyeglasses used for viewing the image displayed by the image display device, wherein the image display device includes: a display portion configured to display the image in time series to be viewed using the image viewing eyeglasses; a synchronization signal generator configured to generate a synchronization signal in synchronization with frame of the image, the synchronization signal including prescribed bit series to transmit bit data described by the presence or absence of a pulse; and a synchronization signal transmitter configured to transmit the synchronization signal, and the image viewing eyeglasses include: an optical filter portion configured to adjust an amount of light transmitted to a left eye and a right eye of a viewer; a synchronization signal receiver configured to receive the synchronization signal transmitted from the synchronization signal transmitter; a synchronization signal analyzer configured to detect the bit series, analyze a pattern of the bit series during a predetermined detection time when the synchronization signal analyzer detects the first pulse received by the synchronization signal receiver, and generate control data to control the optical filter portion; and an optical filter controller configured to control the optical filter portion with the control data.

15 Claims, 23 Drawing Sheets

FIG. 1
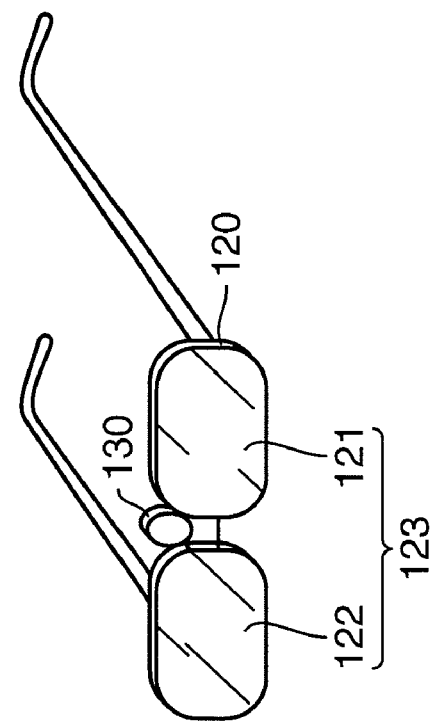
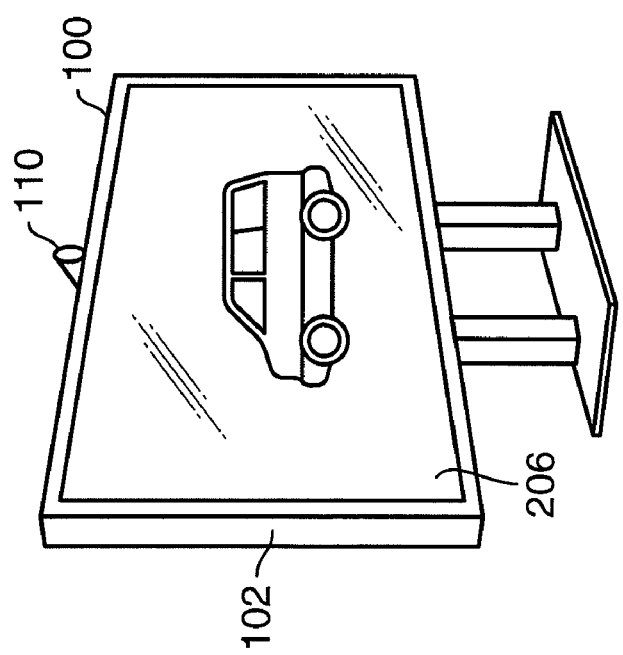

FIG. 10

| PULSE PATTERN | TIMING TO OPEN SHUTTER | TIMING TO CLOSE SHUTTER |
|---|---|---|
| P1 | 200 μs AFTER PULSE RECEIVED | |
| P2 | 350 μs AFTER PULSE RECEIVED | |
| P3 | 500 μs AFTER PULSE RECEIVED | |
| P4 | 650 μs AFTER PULSE RECEIVED | |
| ... | ... | |
| P9 | | AFTER 70% OF FRAME PERIOD FROM RECEPTION OF SHUTTER OPEN PULSE |
| P10 | | AFTER 72.5% OF FRAME PERIOD FROM RECEPTION OF SHUTTER OPEN PULSE |
| P11 | | AFTER 75% OF FRAME PERIOD FROM RECEPTION OF SHUTTER OPEN PULSE |
| ... | | ... |

IMAGE SYSTEM, IMAGE DISPLAY DEVICE AND IMAGE VIEWING EYEGLASSES WITH THEM

This application claims the benefit of U.S. Provisional Application No. 61/220,897 filed Jun. 26, 2009.

BACKGROUND OF THE INVENTION

1. Field of the Invention

This invention relates to an image system comprising a display device configured to display images and image viewing eyeglasses configured to allow viewers to view the images displayed on the image display device as well as to the image display device and the image viewing eyeglasses used for the image system.

2. Description of the Background Art

An image system comprising an image display device configured to display images and an image viewing eyeglasses configured to allow viewers to view the images displayed by the image display device have for example been used to view stereoscopic images. Examples of such image system are disclosed in Japanese Patent Application Laid-open No. H11-98538 and Japanese Patent Application Laid-open No. 2000-36969.

Japanese Patent Application Laid-open No. H11-98538 and Japanese Patent Application Laid-open No. 2000-36969 disclose technologies for communication between the image display device and the image viewing eyeglasses. Japanese Patent Application Laid-open No. H11-98538 discloses a technology to generate internal synchronization signals in the image viewing eyeglasses in order to overcome a drawback such as temporary interruption of the communication between the image display device and the image viewing eyeglasses. Japanese Patent Application Laid-open No. 2000-36969 discloses a technology to adjust a timing for opening/closing shutter of image viewing eyeglasses with a timing of images displayed by the image display device to enhance viewing the images.

As described above, there are various proposals relating to the communication between the image display device and the image viewing eyeglasses as the image system comprising the image display device configured to display images and image viewing eyeglasses configured to allow viewers to view the images displayed by the image display is widely distributed. However, there has been no technology addressing the image system to be utilized for various applications so far. For example, using the technology disclosed in Japanese Patent Application Laid-open No. H11-98538 and Japanese Patent Application Laid-open No. 2000-36969, if a plurality of viewers individually wearing the image viewing eyeglasses view the images on a single image display device, they may not satisfactorily view the images due to interference among a plurality of communications between the image display device and the image viewing eyeglasses. Alternatively a single viewer may not satisfactorily view images on a plurality of the image display devices similarly due to the interference.

When a viewer views two-dimensional images configured to allow her/him to perceive stereoscopic images, she or he perceives that the images leap out of the display device. If the images a viewer views leap out too much, she or he may feel uncomfortable. The technology disclosed in Japanese Patent Application Laid-open No. H11-98538 and Japanese Patent Application Laid-open No. 2000-36969 does not address such drawbacks.

SUMMARY OF THE INVENTION

In light of the above, the present invention directs to the provision of technology for communication between an image display device and image viewing eyeglasses for an image system to be utilized in various applications.

The image system according to one aspect of the invention comprises an image display device configured to display image; and image viewing eyeglasses used for viewing the image displayed by the image display device, wherein the image display device includes: a display configured to display the image in time series to be viewed using the image viewing eyeglasses; a synchronization signal generator configured to generate a synchronization signal in synchronization with frame of the image, the synchronization signal including prescribed bit series to transmit bit data described by the presence or absence of a pulse; and a synchronization signal transmitter configured to transmit the synchronization signal, and the image viewing eyeglasses include: an optical filter portion configured to adjust an amount of light transmitted to a left eye and a right eye of a viewer; a synchronization signal receiver configured to receive the synchronization signal transmitted from the synchronization signal transmitter; a synchronization signal analyzer configured to detect the bit series, analyze a pattern of the bit series during a predetermined detection time when the synchronization signal analyzer detects the first pulse received by the synchronization signal receiver, and generate control data to control the optical filter portion; and an optical filter controller configured to control the optical filter portion with the control data.

An image display device according to another aspect of the invention comprises a display configured to display the image in time series to be viewed using an image viewing eyeglasses; a synchronization signal generator configured to generate a synchronization signal in synchronization with frame of the image, the synchronization signal including prescribed bit series to transmit bit data described by the presence or absence of a pulse; and a synchronization signal transmitter configured to transmit the synchronization signal.

Image viewing glasses according to another aspect of the invention comprise an optical filter portion configured to adjust an amount of light transmitted to a left eye and a right eye of a viewer; a synchronization signal receiver configured to receive a synchronization signal externally transmitted, the synchronization signal including prescribed bit series to transmit bit data described by the presence or absence of a pulse; a synchronization signal analyzer configured to detect the bit series, analyze a pattern of the bit series during a predetermined detection time when the synchronization signal analyzer detects the first pulse received by the synchronization signal receiver, and generate control data to control the optical filter portion; and an optical filter controller configured to control the optical filter portion with the control data.

BRIEF DESCRIPTION OF THE DRAWINGS

FIG. 1 schematically shows a configuration of the image system according to one embodiment of the present invention;

FIG. 10 explains an example of control information allocated in advance to the bit series shown in FIG. 7;

FIG. 13 explains an example of control based on the amount of the parallax explained in

FIG. 6;

DETAILED DESCRIPTION OF THE PREFERRED EMBODIMENTS OF THE INVENTION

Figure 2:
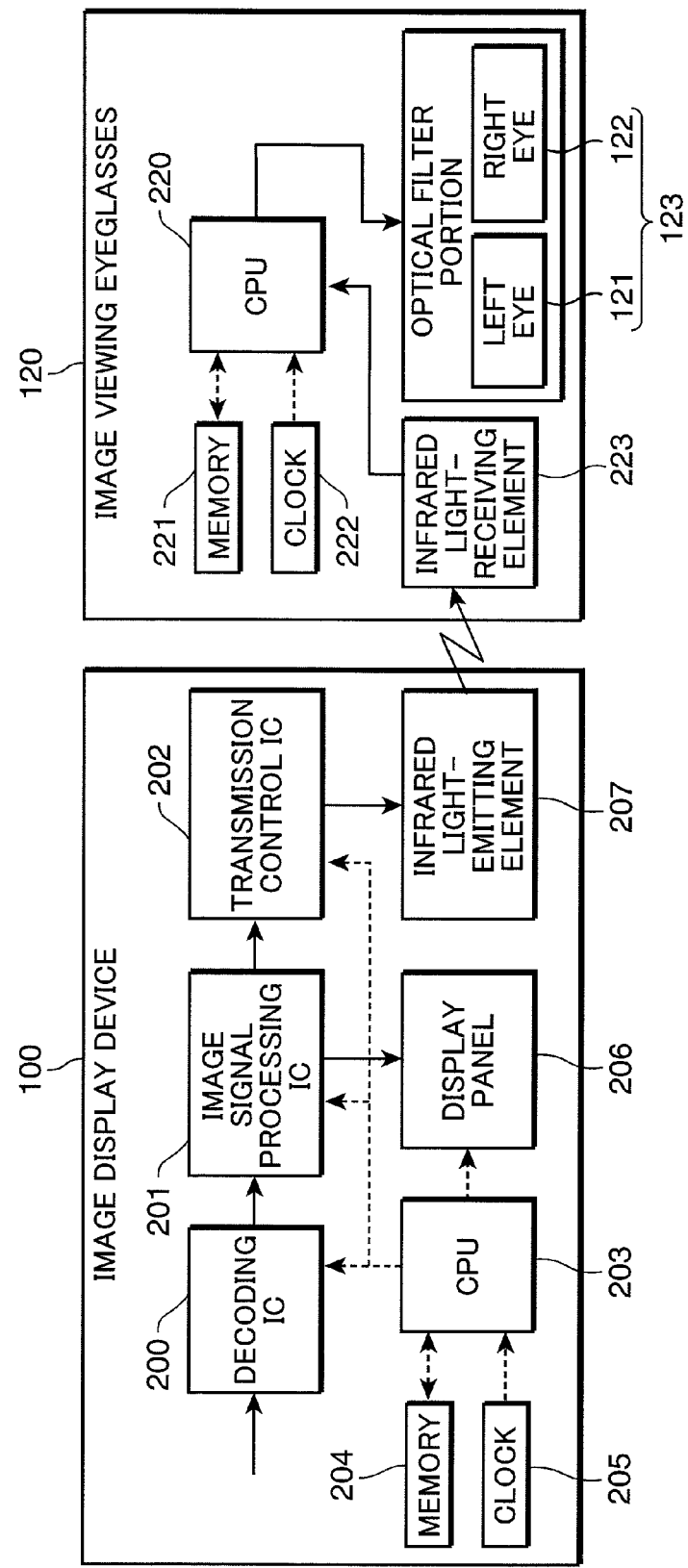
FIG. 2 shows a hardware configuration of the image display device and the image viewing eyeglasses in the image system shown in FIG. 1.

An image system according to an embodiment of the present invention is explained below with referring to the drawings. Configurations, positioning or shapes shown in the drawings as well as descriptions related to the drawings are merely provided for a purpose of facilitating understanding principles of the present invention, and so do not in any way limit the present invention. The term "bit series" used in the following description means a series of plural pulses each of which corresponds to 1 bit of data. The term "control data" used in the following description means data obtained by converting bit series into a format allowing a computer or a similar device to read.

FIG. 1 schematically shows a configuration of an image system according to one embodiment of the present invention. The image system 1 comprises an image display device 100 and image viewing eyeglasses 120 configured to allow a viewer to view the images displayed by the image display device 100. The image display device 100 exemplarily shown in FIG. 1 comprises a rectangular display panel 206, a housing 102 surrounding a periphery of the display panel 206 to form an outer surface of the image display device 100 together with the display panel 206, and a synchronization signal transmitter 110 positioned on the upper edge of the housing 102. The image viewing eyeglasses 120 looks like ordinal eyeglasses for vision correction. The image viewing eyeglasses 120 comprise a left-eye optical filter 121 to be positioned in front of the left eye of the viewer and a right-eye optical filter 122 to be positioned in front of the right eye of the viewer wearing the image viewing eyeglasses 120, and a synchronization signal receiver 130 positioned between the left-eye optical filter 121 and the right-eye optical filter 122. An optical filter portion 123 includes the right-eye optical filter 122 and the left-eye optical filter 121.

FIG. 2 shows a hardware configuration of the image display device 100 and the image viewing eyeglasses 120. The image display device 100 comprises a decoding IC 200, an image signal processing IC 201, a transmission control IC 202, CPU 203, a memory 204, a clock 205, the display panel 206 and an infrared light-emitting element 207.

Encoded image signals are input from the outside to the decoding IC 200. The decoding IC 200 decodes the encoded image signals and outputs image data in a prescribed format. MPEG (Motion Picture Experts Group)-2, MPEG-4, H264 or other methods is applicable for encoding images. Encoded image signals depends on the type of image display device (for example, a device using a CRT, a device using an LCD or other liquid crystal element, a device using organic electroluminescence, a PDP or the like).

The image signal processing IC 201 executes signal processing related to image display (for example, signal processing related to stereoscopic image display). When the image processing device 100 displays stereoscopic images, the image signal processing IC 201 executes processing for image signals and displays the image data from the decoding IC 200 as stereoscopic images. In some embodiment, the image signal processing IC 201 detects images for the left eye and for the right eye from the image data decoded by the decoding IC 200 and then alternately displays the detected left-eye images and right-eye images. In another embodiment, left-eye and right-eye images are automatically generated from the image data output from the decoding IC 200, and then the image signal processing IC 201 outputs the generated left-eye and right-eye images to the display panel 206. After performing the signal processing related to display for the stereoscopic images, the image signal processing IC 201 generates output signals suitable for the signal input method of the display panel 206.

The image signal processing IC 201 may execute processing other than the above processing. For example, the image signal processing IC 201 may further execute processing to adjust hue for images to be displayed according to characteristics of the display panel 206. Alternatively the image signal processing IC 201 may perform processing to raise the frame rate of images by interpolating the images between the frames of the image data generated by the decoding IC 200.

The transmission control IC 202 generates and outputs synchronization signals, which synchronize the left-eye images and the right-eye images generated by the image signal processing IC 201, to the infrared light-emitting element 207.

The CPU 203 controls the entire image display device 100. By controlling constituent portions of the image display device 100 (for example, the decoding IC 200, image signal processing IC 201 and the like), the CPU 203 controls the entire image display device 100. The CPU 203 performs the above control according to a program recorded in the memory 204 or input (not shown) from outside and the like.

The memory 204 configured to store the program executed by the CPU 203 may be used as an area for storing temporary data resulting from the program execution. For example, volatile RAM (Random Access Memory) and nonvolatile ROM (Read Only Memory) may be used as the memory 204.

The clock 205 supplies a clock signal which serves as reference for actions of the CPU 203, the other ICs and constituent portions.

The display panel 206 comprises a display screen. On the display screen are displayed the image signals output from the image signal processing IC. A conventional CRT design, an LCD using a liquid crystal element, a PDP, a method employing organic electroluminescence or various other display methods is applicable to the display panel 206.

The infrared light-emitting element 207 outputs the synchronization signals to the outside using infrared rays under control of the transmission control IC 202.

In this practical embodiment, synchronization between the image display device 100 and the image viewing eyeglasses 120 is effected using the infrared rays but the present invention may not have to use the infrared rays. Wire signals, wireless signals, ultrasound or other transmission means may be used for synchronization between the image display device 100 and the image viewing eyeglasses 120.

The image viewing eyeglasses 120 comprise a CPU 220, a memory 221, a clock 222, an infrared light-receiving element 223, and the optical filter portion 123.

The CPU 220 controls the entire image viewing eyeglasses 120. The CPU 220 controls the image viewing eyeglasses 120 according to a program stored in the memory 221 or external input (not shown).

The memory 221 configured to store data of the program executed by the CPU 220 may hold temporary data resulting from the program execution.

The clock 222 supplies a clock signal, serving as a reference for action, to the various ICs and the like in the image viewing eyeglasses 120. The clock signal may be divided or multiplied as necessary.

The infrared light-receiving element 223 is a light-receiving portion configured to receive the synchronization signals transmitted from the infrared light-emitting element 207 of the image display device 100.

As explained above, the optical filter portion 123 comprises the left-eye optical filter 121 and the right-eye optical filter 122. The optical filter portion 123 appropriately operating for the left eye and for the right eye under control of the CPU 220 creates the desirable optical effect on the wearer of the eyeglasses 120.

The hardware configuration shown in FIG. 2 is merely one example, and so the present invention is not limited thereto. For example, the hardware may comprise an IC integrating a plurality of ICs such as the decoding IC 200 and the image signal processing IC 201 and the like. Further, PLD (Programmable Logic Device) or the like may be used instead of the CPU 203 to execute the program.

Figure 3:
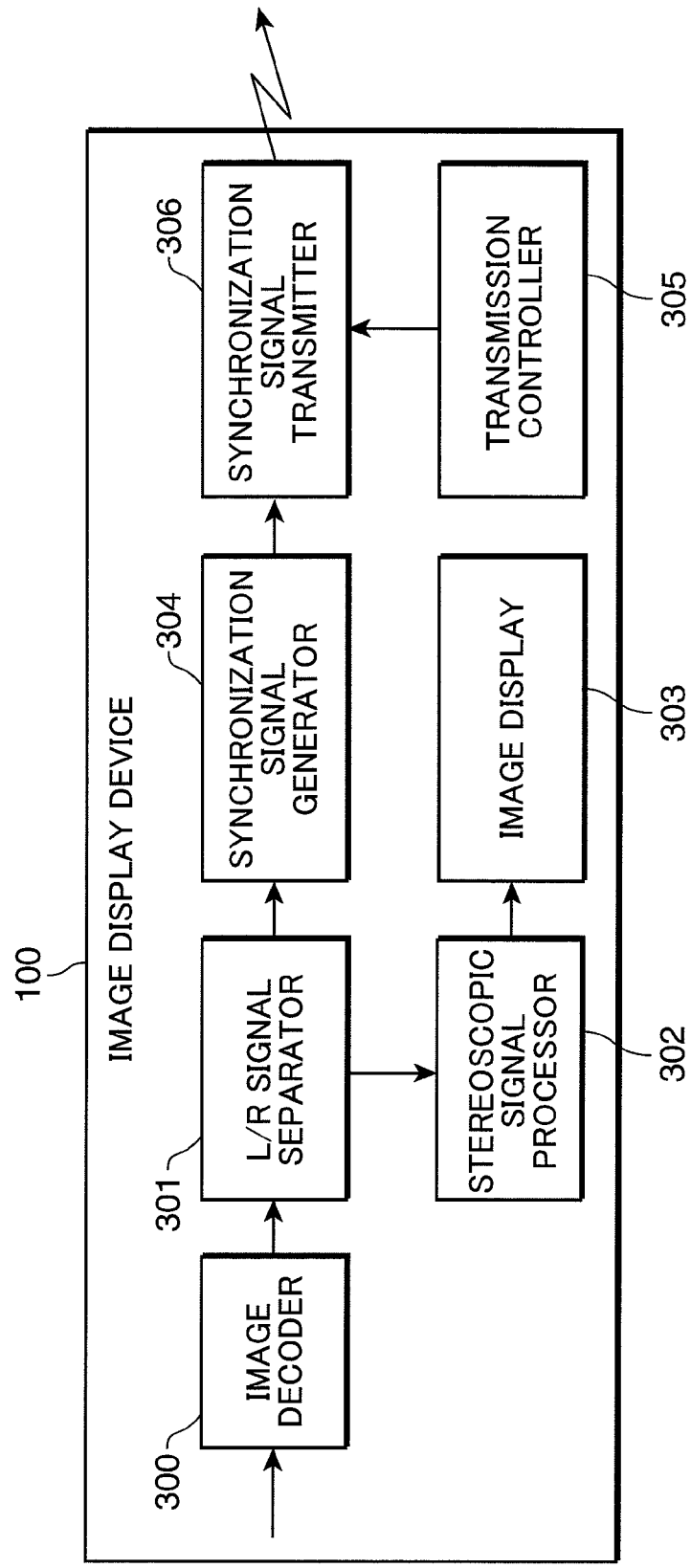
FIG. 3 shows a functional configuration of the image display device in the image system shown in FIG. 1.

FIG. 3 shows a functional configuration of the image display device 100. The image display device 100 comprises an image decoder 300, L/R signal separator 301, stereoscopic signal processor 302, image display 303, synchronization signal generator 304, transmission controller 305, and synchronization signal transmitter 306.

The encoded image signal input from outside is decoded by the image decoder 300. In the hardware configuration shown in FIG. 2, the image decoder 300 corresponds to the decoding IC 200.

The L/R signal separator 301 generates or separates the image signals decoded by the image decoder 300 into the image signals for the left eye and the right eye.

The stereoscopic signal processor 302 adjusts the image signals for the left eye and the right eye separated by the L/R signal separator 301 according to characteristics of the image display 303 configured to display images to be viewed through the image viewing eyeglasses 120. For example, the stereoscopic signal processor 302 executes processing to adjust parallax of the images for the left eye and for the right eye according to a size of the display screen of the image display 303 (display panel 206) and the like.

The synchronization signal generator 304 generates the synchronization signals synchronized with the left-eye and the right-eye images generated by the L/R signal separator 301. At this time, the types of the synchronization signals and their generation timing are adjusted according to the characteristics of the image display 303 and the like.

The L/R signal separator 301, the stereoscopic signal processor 302 and the synchronization signal generator 304 correspond to the image signal processing IC 201 in the hardware configuration shown in FIG. 2.

The image display 303 displays the image signals processed by the stereoscopic signal processor 302 as images. The image display 303 corresponds to the display panel 206 in the hardware configuration shown in FIG. 2.

The synchronization signal transmitter 306 transmits the synchronization signals generated by the synchronization signal generator 304 under control of the transmission controller 305. The synchronization signal transmitter 306 corresponds to the infrared light-emitting element 207 in the hardware configuration shown in FIG. 2.

The transmission controller 305 controls data volume of transmitted synchronization signals, their transmission interval and the like. The transmission controller 305 corresponds to the transmission control IC 202 in the hardware configuration shown in FIG. 2.

Figure 4:
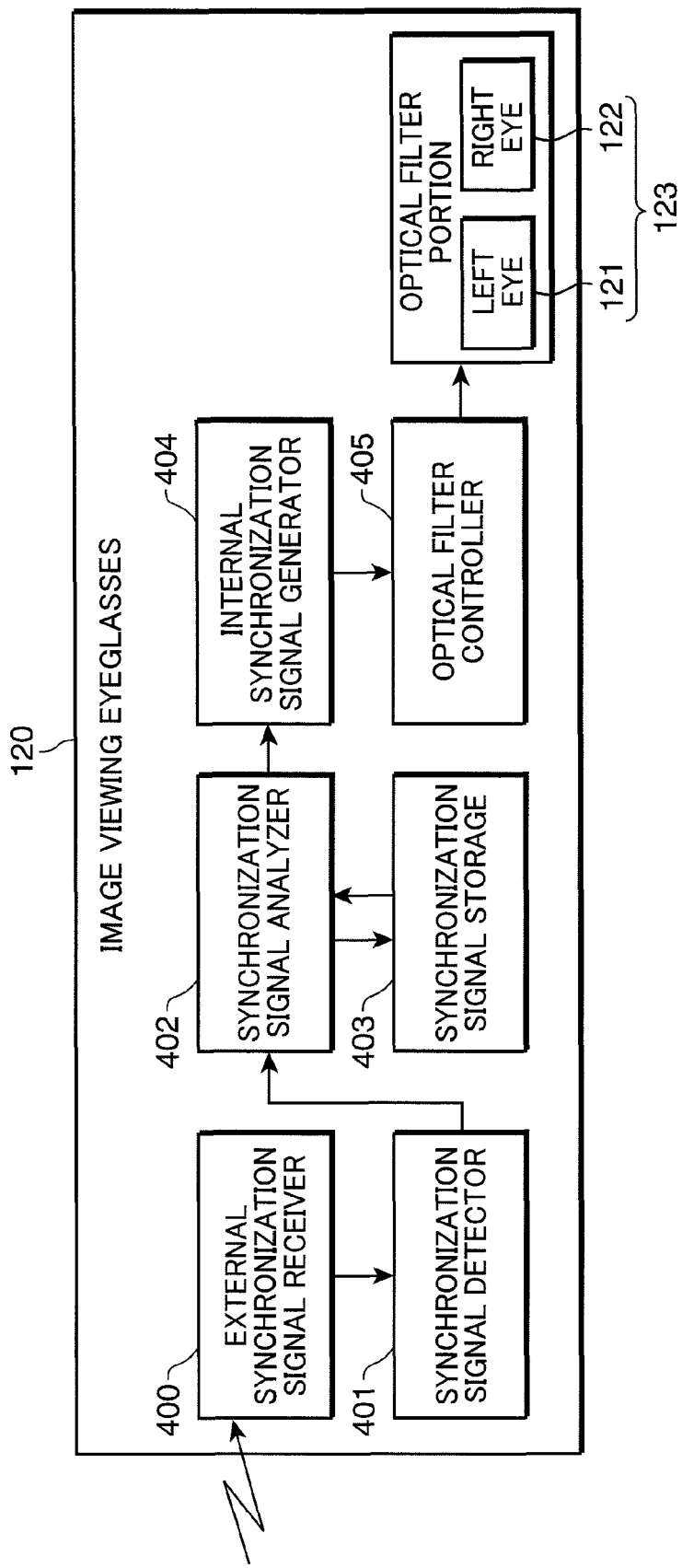
FIG. 4 shows a functional configuration of the image viewing eyeglasses in the image system shown in FIG. 1.

FIG. 4 shows a functional configuration of the image viewing eyeglasses 120. The image viewing eyeglasses 120 comprise an external synchronization signal receiver 400, a synchronization signal detector 401, a synchronization signal analyzer 402, a synchronization information storage 403, an internal synchronization signal generator 404, an optical filter controller (controller) 405 and an optical filter portion 123.

The external synchronization signal receiver 400 receives the synchronization signals transmitted as the infrared rays from the image display device 100. Electrical signals are output to the synchronization signal detector 401 according to the received infrared rays. The external synchronization signal receiver 400 corresponds to the infrared light-receiving element 223 in the hardware configuration shown in FIG. 2.

The synchronization signal detector 401 detects the synchronization signals (electric signals) generated from the infrared rays received by the external synchronization signal receiver 400. The synchronization signals are detected as signals in a prescribed electrical waveform.

The synchronization signal analyzer 402 analyzes time intervals and other information used to operate the optical filter portion 123 based on the bit series in the synchronization signals detected by the synchronization signal detector 401. Information to operate the optical filter portion 123 may be, for example, information on the open/close timing of the left-eye filters and the right-eye filters or the like.

The synchronization signal detector 401 and synchronization signal analyzer 402 correspond to a part of the program executed by the CPU 220 in the hardware configuration shown in FIG. 2.

The synchronization information storage 403 stores and holds control information related to the operation of the optical filter portion 406, which is analyzed by the synchronization signal analyzer 402 based on the synchronization signals. The synchronization information storage 403 corresponds to the memory 221 in the hardware configuration shown in FIG. 2. The CPU 220 stores the control information in the memory 221. The synchronization signal analyzer 402 reads the control information stored in the synchronization information storage 403, and then compares the bit series of the synchronization signals transmitted via the synchronization signal detector 401 with the control information allocated to the bit series in the control information.

The internal synchronization signal generator 404 generates the internal synchronization signals within the image viewing eyeglasses 120 based on the synchronization information stored in the synchronization information storage 403 or based on the synchronization information analyzed by the synchronization signal analyzer 402. The internal synchronization signal generator 404 corresponds to the CPU 220 and the clock 222 in the hardware configuration shown in FIG. 2.

The optical filter controller 405 controls action of the optical filter portion 123 in the image viewing eyeglasses 120 provided for the left eye and the right eye (for example, adjusts the amount of light transmitted through the left-eye optical filter 121 and/or the right-eye optical filter 122 or performs other control). The optical filter controller 405 corresponds to the program configured to allow the CPU 220 to control the optical filter in the hardware configuration shown in FIG. 2.

The left-eye optical filter 121 and/or the right-eye optical filter 122 of the optical filter portion 123, respectively, may be various types of filter to adjust the amount of transmitted light, to adjust a polarization of the transmitted light or the like. The left-eye optical filter 121 and/or the right-eye optical filter 122, respectively, may include and control liquid crystal elements to adjust the amount of the transmitted light.

The present invention is not limited to the functional configurations shown in FIG. 3 and FIG. 4. For example, in the context of FIG. 3 and FIG. 4, the synchronization signal transmitter 306 and image display 303 are included in a single image display device 100, but these may be included in separate devices.

Further, the correspondence relation between the hardware configuration and the functional configuration shown in FIG. 2 through FIG. 4 is merely shown as a specific example for explaining the practical embodiment. Thus the present invention is not limited thereto. Other hardware configurations and other functional configurations may be applied to the present invention.

Figure 5:
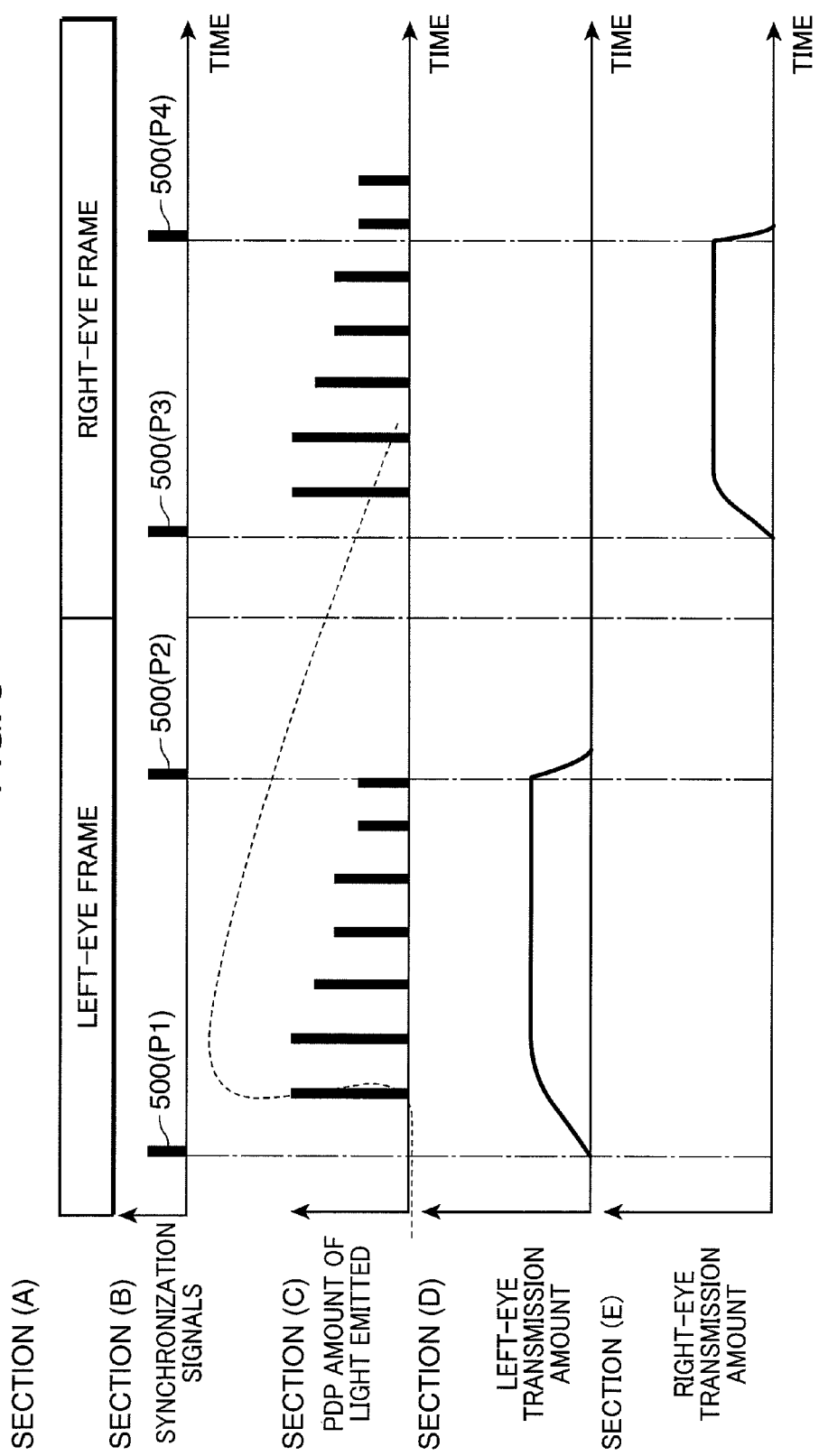
FIG. 5 explains an example of control for the image system shown in FIG. 1.

FIG. 5 shows an example of control for the optical filter portion 123 when the image display device 100 displays stereoscopic images. As shown in Section (A) of FIG. 5, the image display 303 displays a left-eye frame image showing an image to be viewed by the left eye, and then displays a right-eye frame image showing an image to be viewed by the right eye.

Figure 6:
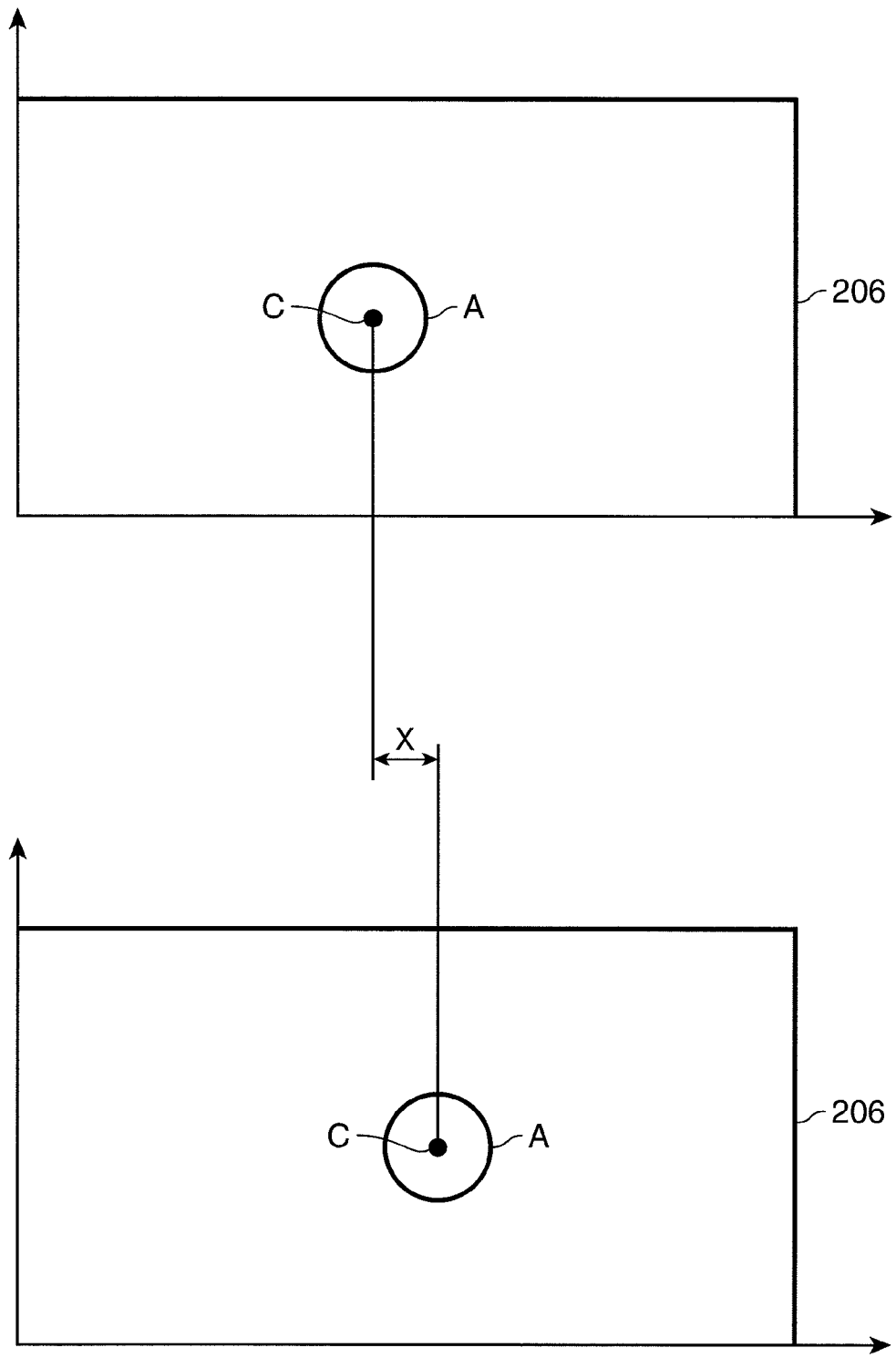
FIG. 6 explains an amount of parallax between a left-eye image and a right-eye image displayed by the image display device in the image system shown in FIG. 1.

FIG. 6 shows examples of an image displayed on the display panel 206 in the left-eye frame shown in FIG. 5 and an image displayed on the display panel 206 in the right-eye frame.

Upper drawing in FIG. 6 is the left-eye frame image in the display panel 206 while lower drawing in FIG. 6 is the right-eye frame image in the display panel 206. The object "A" displayed in both frames is the same object, but it is seen that the display position in the display panel 206 differs slightly. The difference in display position may be a difference due to parallax. The object "A" shown in FIG. 6 is circular without any difference in shape between the left-eye frame and the right-eye frame for ease of explanation, but it depends on the shape of the object "A" whether the shapes of the object displayed in the left-eye frame is different from that displayed in the right-eye frame by the amount of the parallax. The parallax may, for example, be defined as the difference in positions of the center point C of the object "A" on the upper display panel 206 and the center point C of the object "A" in the lower display panel 206. Other quantities related to the difference between the images to be viewed by the left eye and by the right eye may be, however, considered as a definition of the parallax.

Referring once again to FIG. 5, Section (B) shows that there exist two synchronization signals 500 corresponding to the left-eye frames and two synchronization signals 500 corresponding to the right-eye frames. Section (D) of FIG. 5 shows the amount of the light transmitted through the left-eye optical filter 121 while Section (E) of FIG. 5 shows the amount of light transmitted through the right-eye optical filter 122. Referring to Sections (B), (D) and (E), the left-eye optical filter 121 opens to increase the amount of the light transmitted to the left eye of the viewer in response to the first synchronization signal 500. The optical filter 121 closes to decrease the amount of the light transmitted to the left eye in response to the next synchronization signal 500. The right-eye optical filter 122 opens to increase the amount of the light transmitted to the right eye in response to the third transmitted synchronization signal 500. The right-eye optical filter 122 closes to decrease the amount of the light transmitted to the right eye in response to the last synchronization signal 500. In the example shown in FIG. 5, in order to clarify the relation between each of the synchronization signals 500 and the optical filter 121, the left-eye optical filter 121 and/or right-eye optical filter 122 open or close simultaneously with the synchronization signals 500, but actions of the left-eye optical filter 121 and/or right-eye optical filter 122 may delay from the synchronization signals 500.

Section (C) of FIG. 5 shows the amount of the light emitted from a plasma display panel used as the image display 303. The image display 303 may obtain the amount of the light in each subfield shown as a bar graph. A change with time in the amount of light emitted from all pixels in the image display 303 is described with a curve. Section (C) shows that light emission by the image display 303 slightly delays from the amount of the light emitted in each subfield. The delay results from response characteristics during light emission and persistence characteristics during extinction of the phosphors sealed into pixels or the like. Referring to Section (C), the delay causes afterglow in the left-eye frame affecting the right-eye frame. Referring to Section (D) and (E) of FIG. 5, the left-eye optical filter 121 is controlled so as to close simultaneously with completion of subfield light emission in the left-eye frame (before there is switching between the left-eye frame and right-eye frame) while the right-eye optical filter 122 is controlled so as to open after afterglow from the left-eye frame sufficiently declines. In the following description, phrases such as "the left-eye optical filter 121, right-eye optical filter 122 and/or optical filter portion 123 opens" or similar expressions mean that the amount of the light reaching the left eye and/or right eye of the viewer through the left-eye optical filter 121, the right-eye optical filter 122 and/or the optical filter portion 123 increases. Phrases such as "the left-eye optical filter 121, right-eye optical filter 122 and/or optical filter portion 123 closes" or similar expressions mean that the amount of the light reaching the left eye and/or the right eye of the viewer through the left-eye optical filter 121, the right-eye optical filter 122 and/or the optical filter portion 123 decreases.

Figure 7:
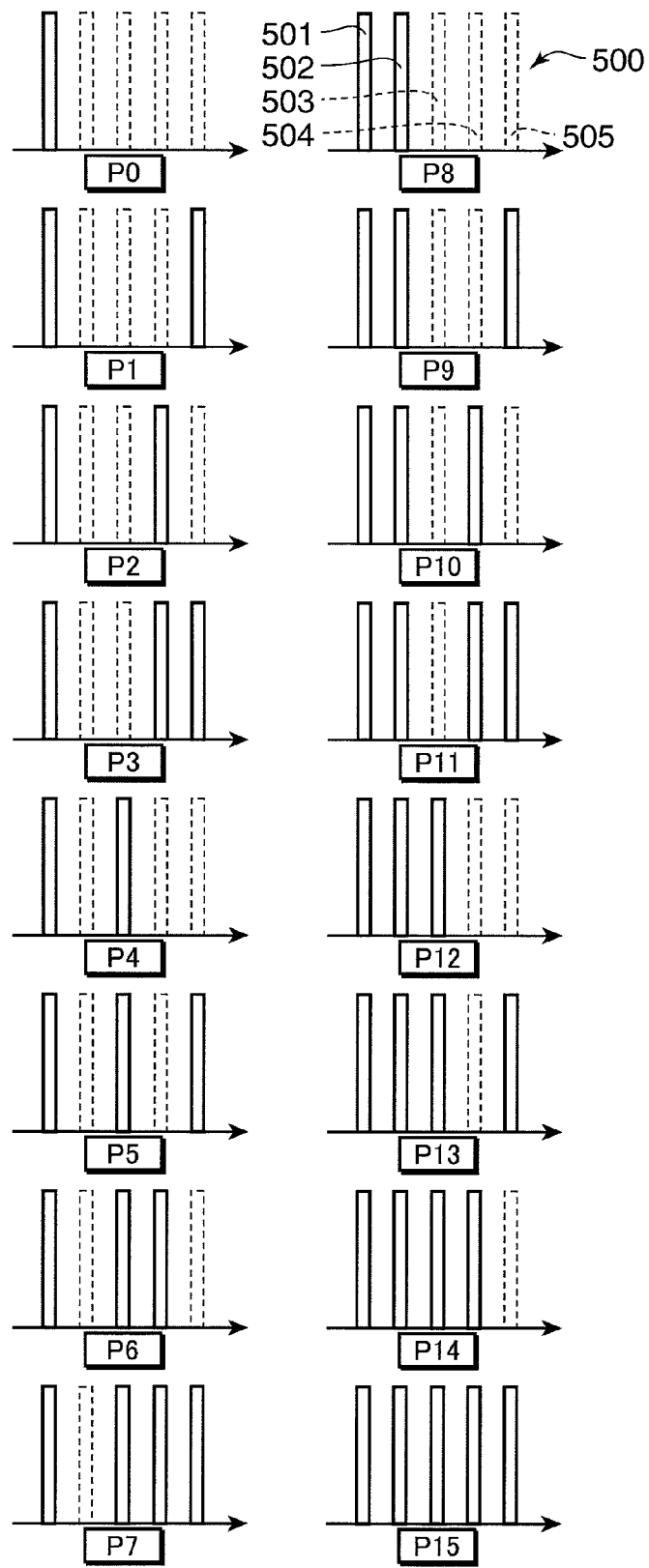
FIG. 7 shows bit series patterns of the synchronization signals communicated between the image display device and image viewing eyeglasses in the image system shown in FIG. 1.

FIG. 7 shows various signal waveforms of the synchronization signals 500 comprising bit series with at least one pulse. In the embodiment shown in FIG. 7, the bit series may comprise five pulses at the maximum, but the number of pulses in bit series is not limited to that of the embodiment shown in FIG. 7. The waveforms shown with solid lines in FIG. 7 indicate existence of the pulses while the waveforms shown with dotted lines indicate absence of the pulses. Patterns of the bit series P0 through P15 shown in FIG. 7 are mutually different. In this embodiment, the synchronization signal generator 304 may generate the synchronization signals 500 having bit series with any of the patterns shown in FIG. 7. In some embodiment, the bit series patterns of the synchronization signals generated by the synchronization signal generator 304 are predetermined so that signals having bit series except for the predetermined patterns are rejected as noises. When all pulses as indicated by the bit series P15 exist, the pulse waveform period (interval between pulses) is constant. As shown in FIG. 7, in the synchronization signal 500, pulse 501 in the first position is provided for all bit series P0 through P15. The pulse 501 serves as a timing pulse to notify transmission of the synchronization signal 500 to the image viewing eyeglasses 120. The other pulses 502 through 504 serve to transmit control details (information/contents) for the optical filter portion 123 and other information.

For example, the synchronization signal 500 transmitted first in the left-eye frame shown in FIG. 5 may have the bit series P1. The synchronization signal 500 transmitted next in the left-eye frame shown in FIG. 5 may have the bit series P2. The synchronization signal 500 transmitted first in the right-eye frame in FIG. 5 may have the bit series P3. The synchronization signal 500 transmitted next in the right-eye frame in FIG. 5 may have the bit series P4.

Figure 8:
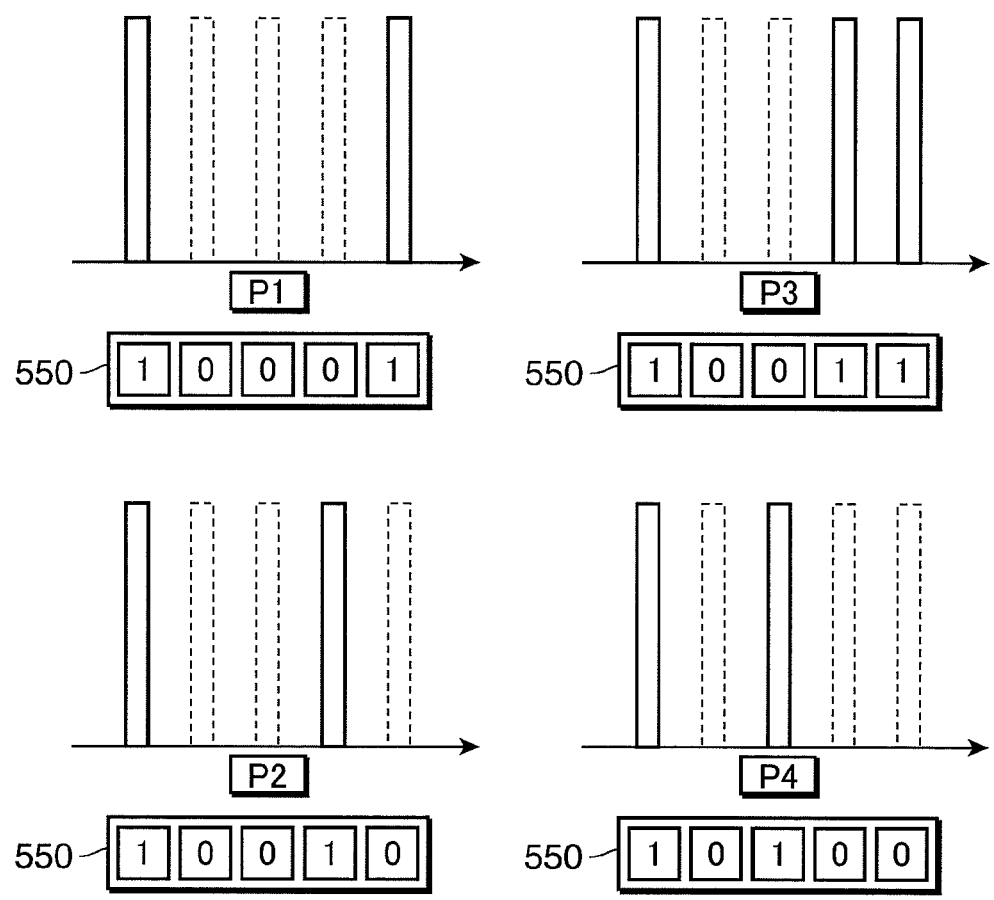
FIG. 8 explains the relation between the bit series shown in FIG. 7 and control data.

FIG. 8 shows an example for conversion of the bit series P1 through P4 into binary data. The first pulse 501 in each of the bit series P1 through P4 is used as timing data representing the timing of the bit series so that it always takes the value "1" over various control defined by the bit series. The synchronization signal generator 304 transmits four synchronization signals 500, respectively, comprising the bit series P1 through P4. Then the external synchronization signal receiver 400 receives each of them. The received bit series P1 through P4 are converted into control data 550 as binary-converted bit data by the synchronization signal analyzer 402. As shown in FIG. 8, different control data 550 is generated from synchronization signals 500 having different bit series. The control data 550 is stored in the synchronization information storage 403. The internal synchronization signal generator 404 generates internal synchronization signals based on the stored control data 550, and then sends the generated internal synchronization signals to the optical filter controller 405. Information on control executed by the optical filter controller 405 is allocated in advance to each of the control data sets 550. In the control shown in FIG. 5, information on control to open the left-eye optical filter 121 is allocated to the control data set 550 corresponding to the bit series P1; information on control to close the left-eye optical filter 121 is allocated to the control data set 550 corresponding to the bit series P2; information on control to open the right-eye optical filter 122 is allocated to the control data set 550 corresponding to the bit series P3; and information on control to close the right-eye optical filter 122 is allocated to the control data set 550 corresponding to the bit series P4. Thus the optical filter portion 123 is controlled as explained in the context of FIG. 5.

In the example of FIG. 8, the first pulse of the bit series is always "1" but the present invention is not limited thereto. According to alternative embodiment, for example, only the last pulse may be always "1". The alternative embodiment may detect the end pulse of the bit series more accurately than the first pulse in the bit series depending on the characteristics of the light-receiving element and electronic circuitry used in transmitting and receiving pulse series. According to further alternative embodiment, the first and last pulses of the bit series may always be set to "1" so that the start and end of bit series may be detected more accurately.

Figure 9:
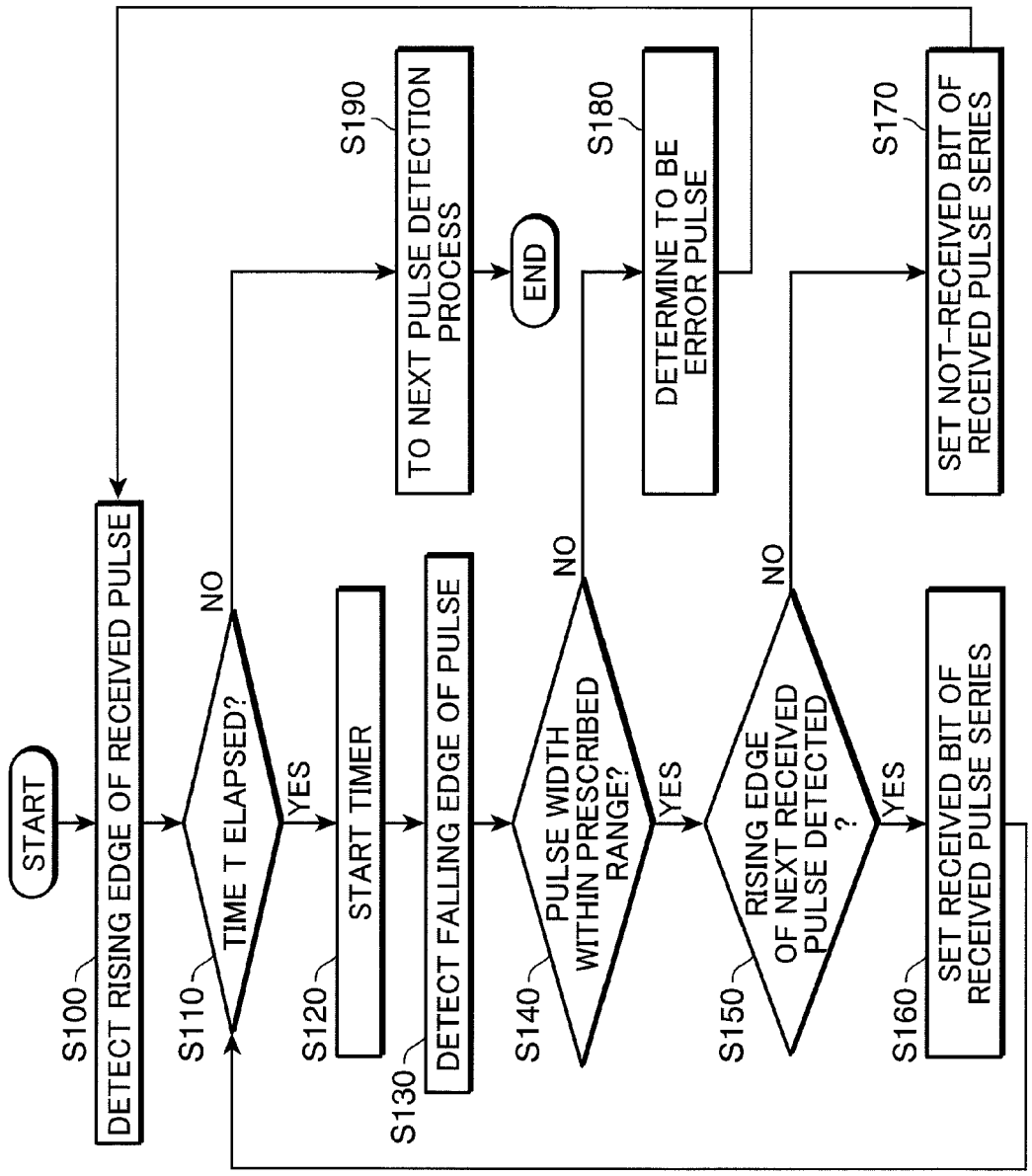
FIG. 9 is a flowchart explaining processes for generating the control data shown in FIG. 8.

FIG. 9 is a flowchart explaining an example of a process to generate control data 550 by the synchronization signal analyzer 402. The rising edge of the first pulse 501 in the bit series of the synchronization signal 500 is detected (S100). The synchronization signal analyzer 402 determines whether a time T stored in memory 221 elapses (S110). The time T is a time length from a time for the rising edge of the first pulse 501 to a time for the falling edge of the last pulse 505 in the bit series having the greatest number of pulses. The elapsed time does not exceed the time T when the first pulse 501 is detected, and so thereafter a timer is started (S120). Then, when the falling edge of the first pulse 501 is detected (S130), the pulse width is confirmed based on the time measured by the timer (S140). If the pulse width deviates from a threshold value range for the pulse width, which is stored in memory 221, the pulse is determined as an error pulse (S180) and then processing returns to the initial process S100. When the pulse width confirmed in process S140 is within the threshold value range, a process to detect the rising edge of the next received pulse 502 is executed (S150). When the rising edge of the received pulse 502 is detected, the synchronization signal analyzer 402 sets a received bit (S160). In the example shown in FIG. 9, the synchronization signal analyzer 402 generates a binary data "1". In process S150, when no pulse rising edge is detected for a prescribed amount of time, the synchronization signal analyzer 402 generates a binary data "1" corresponding to the first pulse 501, sets a not-received bit for the next pulse 502, and generates binary data "0" (S170). When the received bit is set, processing returns to S110 so that the synchronization signal analyzer 402 determines whether time T elapses again. When the not-received bit is set, processing returns to S100 and the detection for the rising edges of the third and subsequent pulses 503, 504, 505 is executed. When these processes are executed and time T elapses, the process for control data generation ends, and then a process to extract the next bit series is executed (S190).

FIG. 10 shows an example showing allocation of information for the opening/closing timing of the optical filter portion 123 to the various bit series shown in FIG. 7. As shown in FIG. 10, by using the synchronization signals 500 comprising the bit series, the optical filter portion 123 may be opened and closed at various timings. The information shown as an example in FIG. 10 is stored in the synchronization information storage 403.

Figure 11:
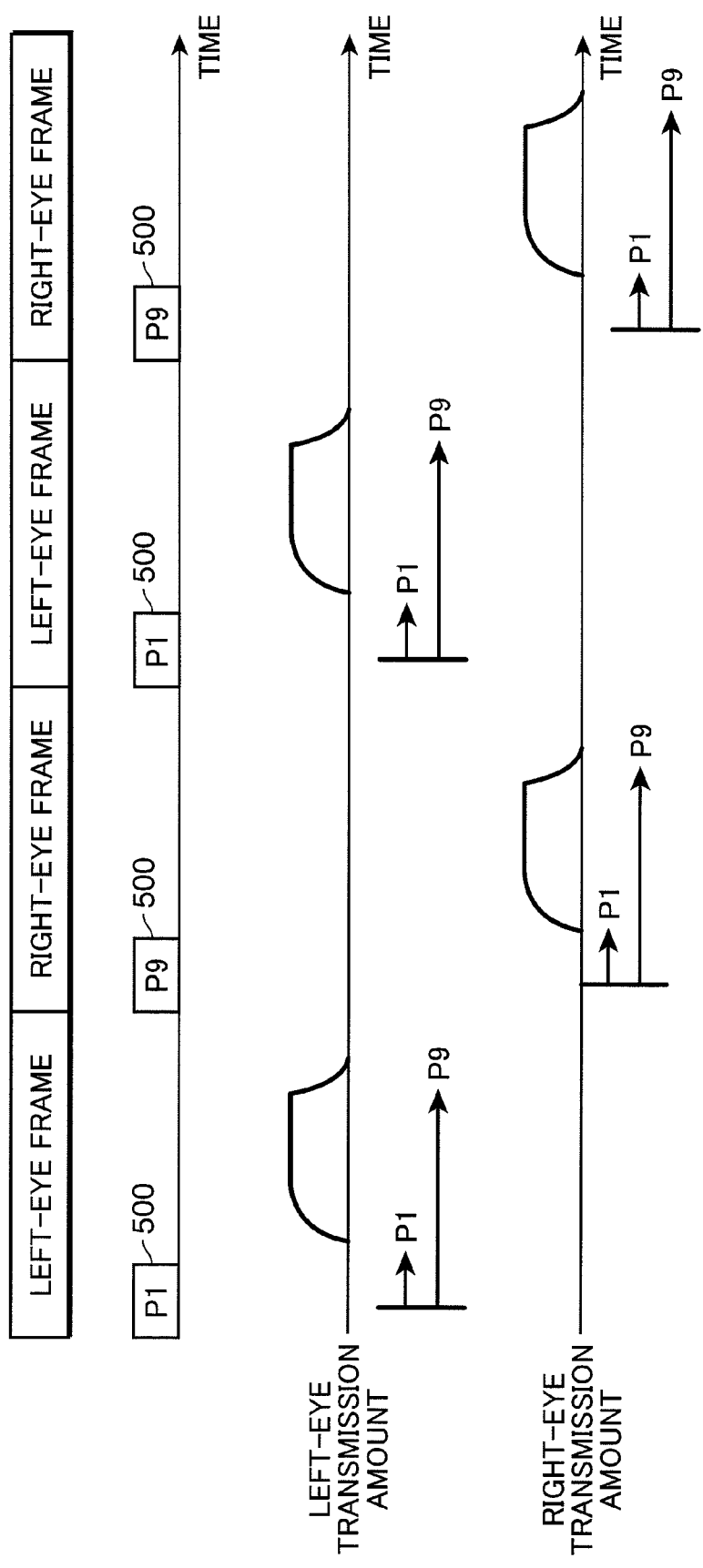
FIG. 11 explains an example of control to reduce the number of communications between the image display device and image viewing eyeglasses in the image system shown in FIG. 1.

FIG. 11 shows an example showing control of the optical filter portion 123 using the bit series P1 and P9 among the bit series shown in FIG. 10. As shown in FIG. 10, information on control to open the optical filter portion 123 "200 μseconds" after a reception of the first pulse 501 of the bit series P1 is allocated to the bit series P1 while information on control to close the optical filter portion 123 after 70% of the frame period elapses from a reception of the first pulse 501 in the bit series P9 is allocated to the bit series P9.

As shown in FIG. 11, the synchronization signal generator 304 generates the synchronization signal 500 comprising the bit series P1 synchronized with the start timing of the left-eye frame. The synchronization signal generator 304 further generates the synchronization signal 500 comprising the bit series P9 synchronized with the start timing of the right-eye frame. The synchronization signals 500 generated by the synchronization signal generator 304 are transmitted from the synchronization signal transmitter 306 under control of the transmission controller 305. The transmitted synchronization signals 500 are received by the external synchronization signal receiver 400 and then subjected to the processes explained in the context of FIG. 9 so that control data 550 is generated and stored in the synchronization information storage 403. The synchronization signal analyzer 402 analyzes a time from a start of a frame to opening of the optical filter portion 123 based on information included in the bit series P1 under a condition that timings for opening and closing the right-eye optical filter 122 may be equivalent to those of the left-eye optical filter 121. The analysis results of the synchronization signal analyzer 402 are transmitted to the internal synchronization signal generator 404. The internal synchronization signal generator 404 generates the internal synchronization signals for control to open the optical filter portion 123 at the time analyzed based on the information defined by the bit series P1 and to close the optical filter portion 123 at the time analyzed based on the information defined by the bit series P9. The optical filter controller 405 controls the optical filter portion 123 based on these internal synchronization signals.

In the embodiment shown in FIG. 11, one synchronization signal 500 is transmitted at the start time of each frame, but the practical embodiment is not limited to such a configuration. The synchronization signals 500 may be transmitted with the same period as the period for switching of frames. Even when the phase of transmission of synchronization signals 500 shifts from the phase of switching the frames, the embodiment illustrated in FIG. 11 may be practical.

In the embodiment shown in FIG. 11, the period for transmitting the synchronization signals 500 coincides with the frame switching period. Therefore the CPU worked as the internal synchronization signal generator 404 may execute processing to stop power supply to the external synchronization signal receiver 400, the synchronization signal detector 401, the synchronization signal analyzer 402 and/or the synchronization signal storage 403 except for the timing at which the image viewing eyeglasses 120 receive the synchronization signals 500. Thus power consumption by the image viewing eyeglasses 120 may be suppressed.

Figure 12:
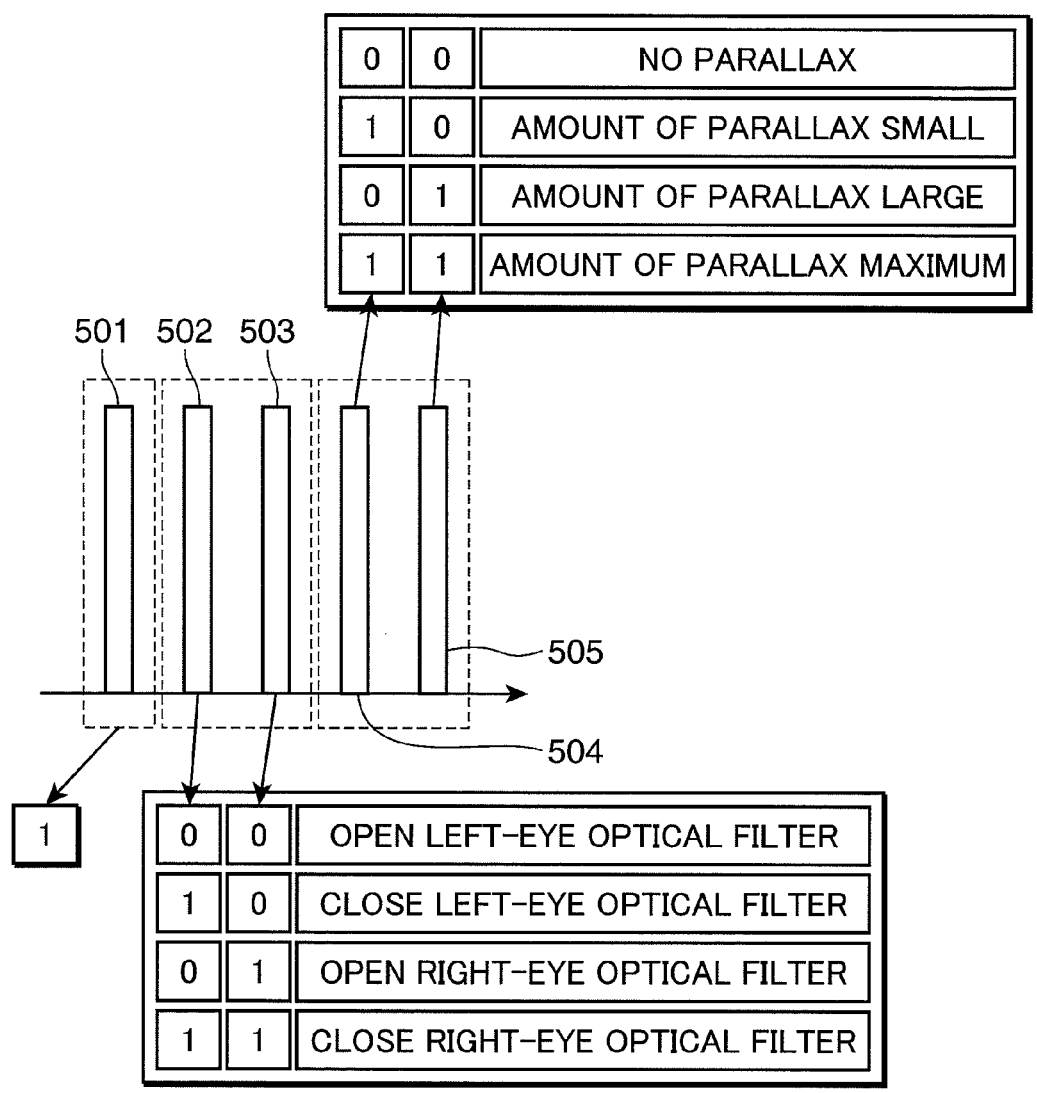
FIG. 12 shows an example of control information allocated to the bit series of the synchronization signals communicated between the image display device and the image viewing eyeglasses in the image system shown in FIG. 1.

FIG. 12 shows an example of information on control allocated to bit series pulses. As explained above, the first pulse 501 in the bit series is used as a timing pulse so that the control data "1" is always used. The pulses 502 and 503 are allocated to information on control to open and close the optical filter portion 123. The pulses 504 and 505 are allocated to information on control based on information relating to the amount of the parallax explained in the context of FIG. 6. When the control data sets 550 corresponding to the pulse 502 and the pulse 503 are the combination of values "0" "0", the optical filter controller 405 executes the control to open the left-eye optical filter 121. When the control data sets 550 corresponding to the pulse 502 and the pulse 503 are the combination of values "1" "0", the optical filter controller 405 executes the control to close the left-eye optical filter 121. When the control data sets 550 corresponding to the pulse 502 and the pulse 503 are the combination of values "0" "1", the optical filter controller 405 executes the control to open the right-eye optical filter 122. When the control data sets 550 corresponding to the pulse 502 and the pulse 503 are the combination of values "1" "1", the optical filter controller 405 executes the control to close the right-eye optical filter 122. Based on information transmitted from the L/R signal separator 301, the synchronization signal generator 304 calculates the magnitude of the amount of the parallax between the left images and the right images and classifies the parallax amount into four levels based on the calculated magnitude.

In FIG. 12, depending on the information combination, only pulse 501 may be "1" while the other pulses 502 through 505 are all "0". In such a case, the pulse 501 valued as "1" may potentially and accidentally handled as a noise signal. Therefore it is preferable that either use of signals in which all pulse values other than the pulse 501 are "0" be forbidden, or else that an identification pulse (so that two or more pulses are "1") or the like be added to enhance identification for the bit series.

Figure 13:
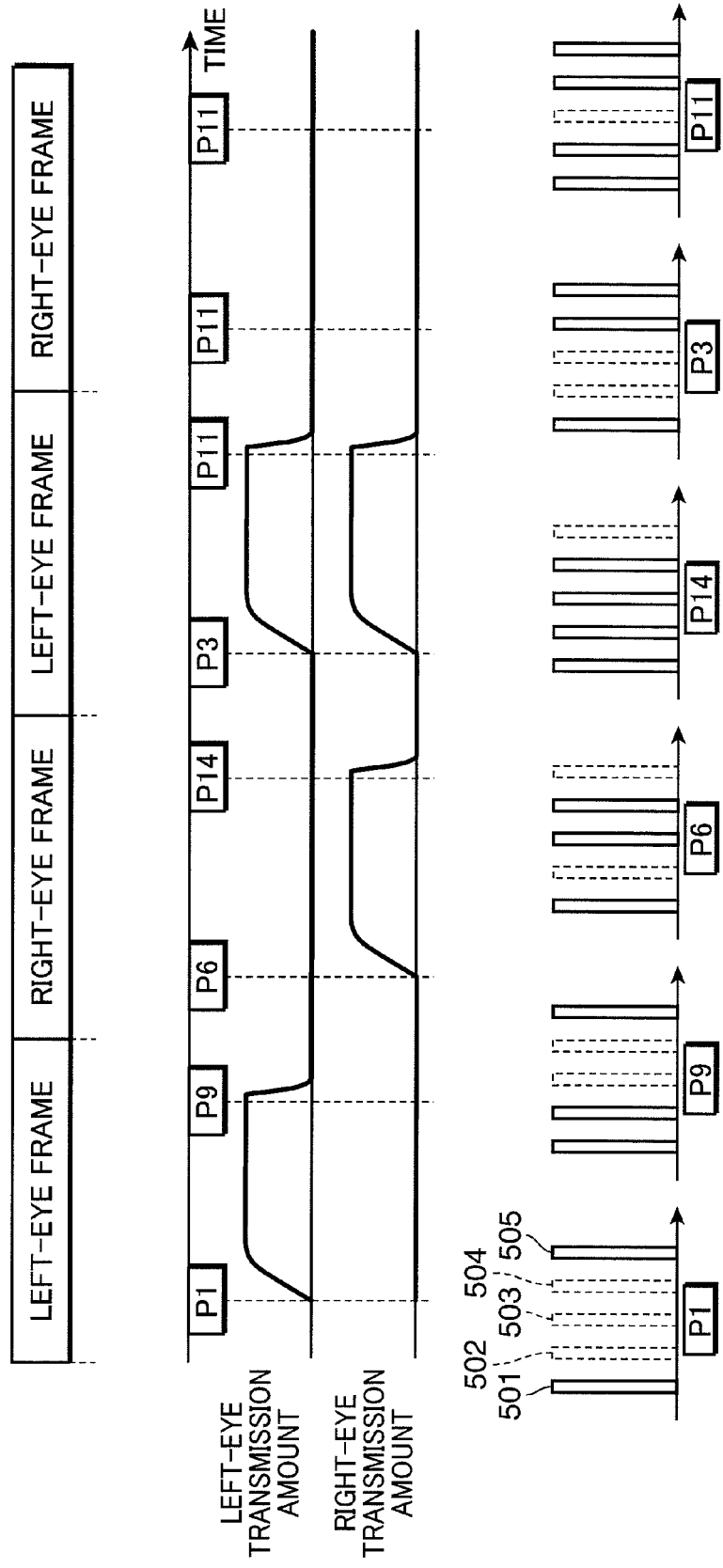

FIG. 13 shows an example of control using the synchronization signals 500 having the bit series including information relating to the parallax amounts explained in the context of FIG. 12. In the first left-eye frame shown in FIG. 13, the synchronization signals 500 comprising the bit series P1 and P9 are transmitted. Based on these synchronization signals 500, the optical filter controller 405 opens and closes the left-eye optical filter 121. At this time, these synchronization signals 500 indicate that the amount of parallax is large. Next, in the right-eye frame, the synchronization signals 500 comprising the bit series P6 and P14 are transmitted. Based on these synchronization signals 500, the optical filter controller 405 opens and closes the right-eye optical filter 122. At this time, these synchronization signals 500 indicate that the amount of parallax is small. In the next left-eye frame, the synchronization signals 500 comprising the bit series P3 and P11 are transmitted. The set of the second pulse 502 and third pulse 503 of the bit series P3 and P11 specify control to open the left-eye optical filter while the set of the fourth pulse 504 and fifth pulse 505 specify that the amount of the parallax is the maximum level. At this time, the optical filter controller 405 prefers control based on information defined by the set of the fourth pulse 504 and fifth pulse 505 rather than control based on the set of the second pulse 502 and third pulse 503, so that the optical filter controller 405 executes control to open both the left-eye optical filter 121 and the right-eye optical filter 122. Thus, the image perceived by the viewer changes from a three-dimensional stereoscopic image to a two-dimensional planar image, so that she or he may not perceive that the object in the image leap out too much. It is preferable that the image viewing eyeglasses 120 comprise a switch configured to switch a threshold for the amount of the parallax. The viewer operating the switch may change the threshold value for switching from three-dimensional stereoscopic images to two-dimensional planar images between "small amount of parallax" and "large amount of parallax" or between "large amount of parallax" and "maximum amount of parallax" as indicated in FIG. 12 as desired.

Figure 14:
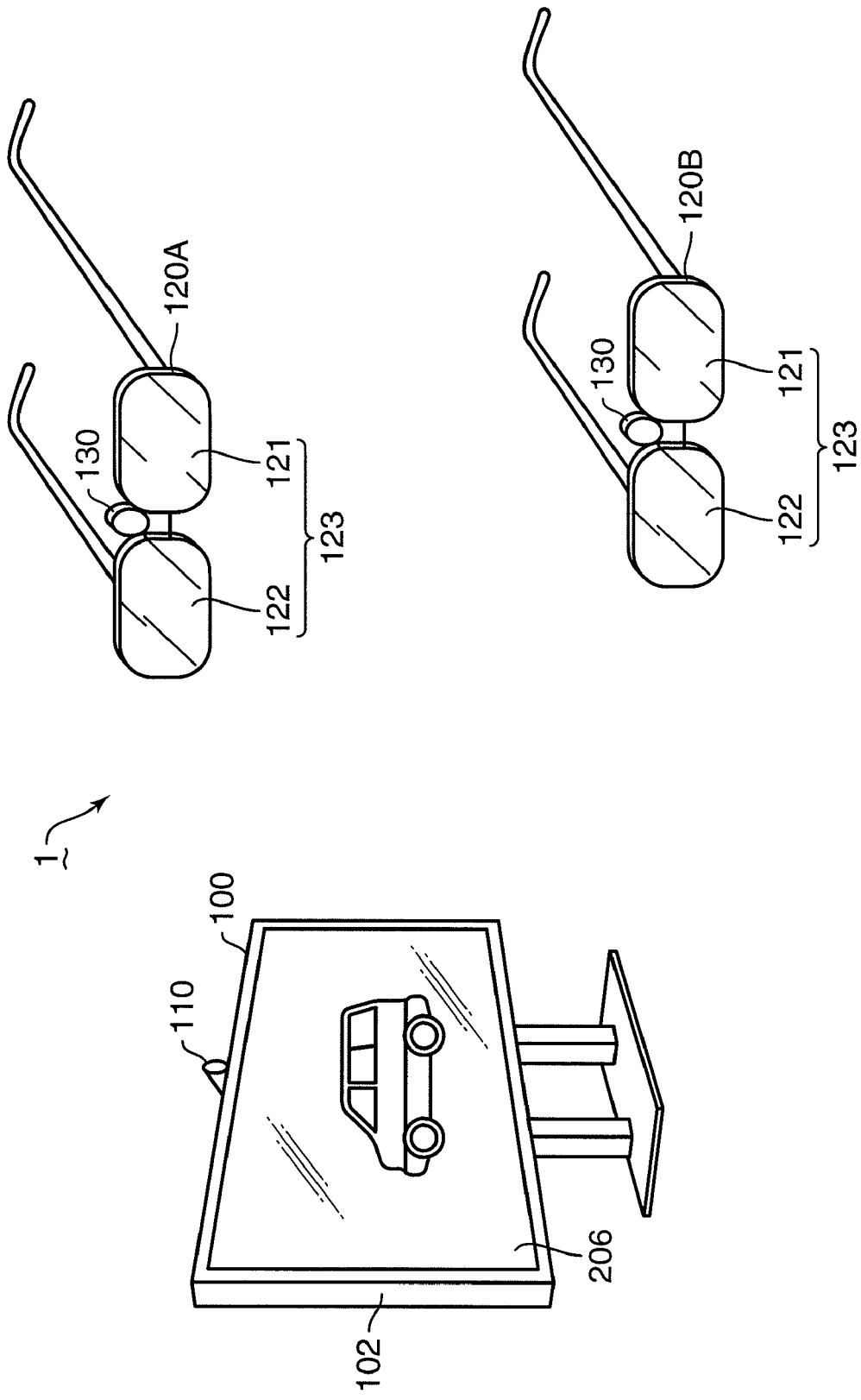
FIG. 14 schematically shows a configuration of the image system comprising one image display device and a plurality of image viewing eyeglasses according to one embodiment of the invention.

FIG. 14 shows another embodiment of the image system 1. The image system 1 shown in FIG. 14 comprises one image display device 100 and a plurality of image viewing eyeglasses 120A, 120B. In FIG. 14, two pairs of the image viewing eyeglasses 120A, 120B are shown but three or more pairs of the image viewing eyeglasses 120 may be used.

Figure 15:
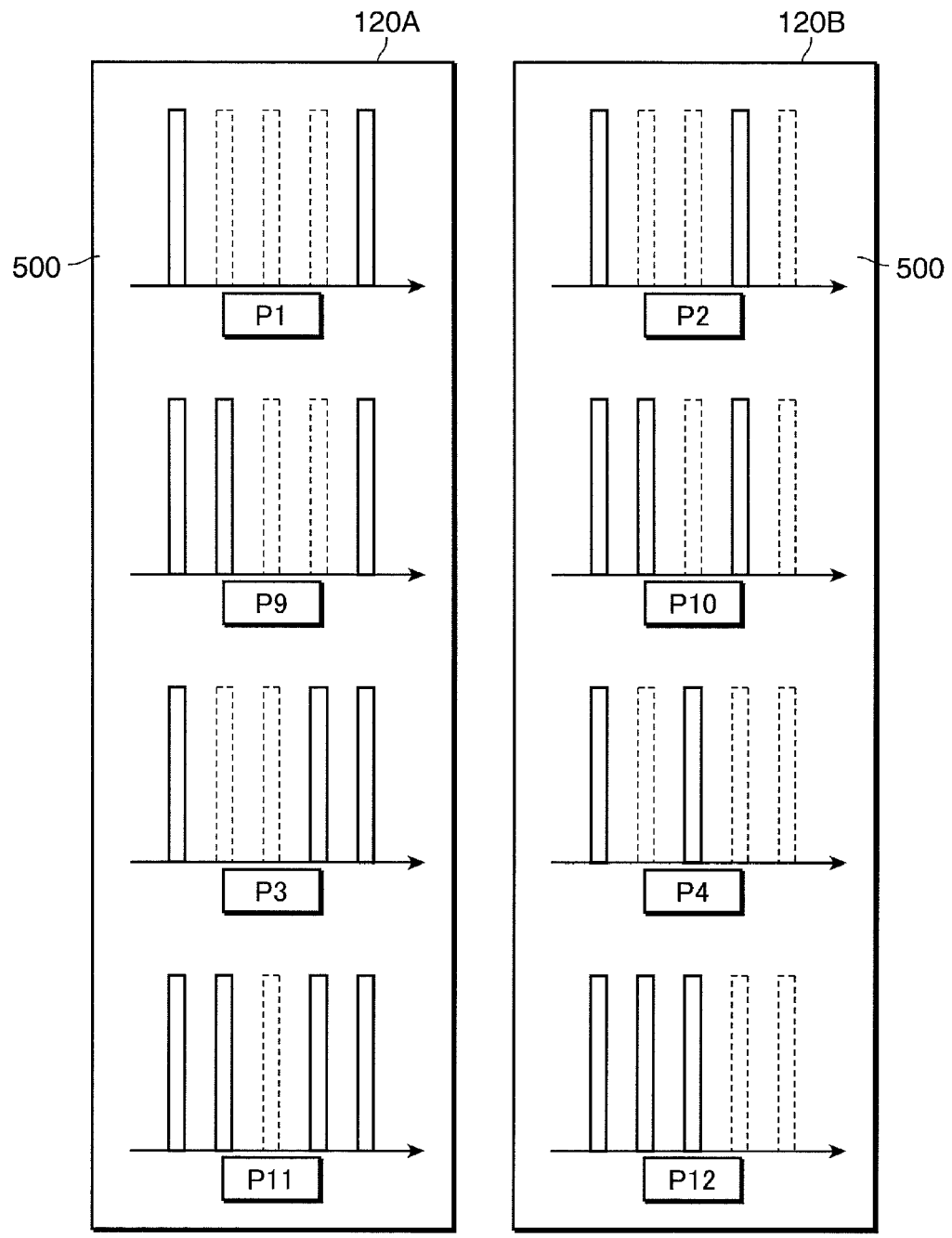
FIG. 15 shows an example of a set of bit series of synchronization signals received by the image viewing eyeglasses shown in FIG. 14.

FIG. 15 shows the types of the synchronization signals 500 for the image viewing eyeglasses 120A, 120B. The synchronization signals 500 including the bit series P1, P9, P3, and P11 are synchronization signals 500 for controlling the image viewing eyeglasses 120A. The synchronization signals 500 including the bit series P2, P10, P4, and P12 are synchronization signals 500 for controlling the image viewing eyeglasses 120B. The synchronization signals 500 including the bit series P1, P9, P3, and P11 are allocated to information on control to cause action of the image viewing eyeglasses 120A just after detection of the first pulse in the bit series P1, P9, P3, and P11. The synchronization signals 500 including the bit series P2, P10, P4, and P12 are allocated to information on control to cause action of the image viewing eyeglasses 120B a prescribed time after detection of the first pulse in the bit series P2, P10, P4, and P12.

The synchronization signals 500 with the bit series P1 and P2 are used to perform control to open the left-eye optical filters 121 of the image viewing eyeglasses 120A and 120B, respectively. The synchronization signals 500 with the bit series P9 and P10 are used to perform control to close the left-eye optical filters 121 of the image viewing eyeglasses 120A and 120B, respectively. The synchronization signals 500 with the bit series P3 and P4 are used to perform control to open the right-eye optical filters 122 of the image viewing eyeglasses 120A and 120B, respectively. The synchronization signals 500 having the bit series P11 and P12 are used to perform control to close the right-eye optical filters 122 of the image viewing eyeglasses 120A and 120B, respectively.

Figure 16:
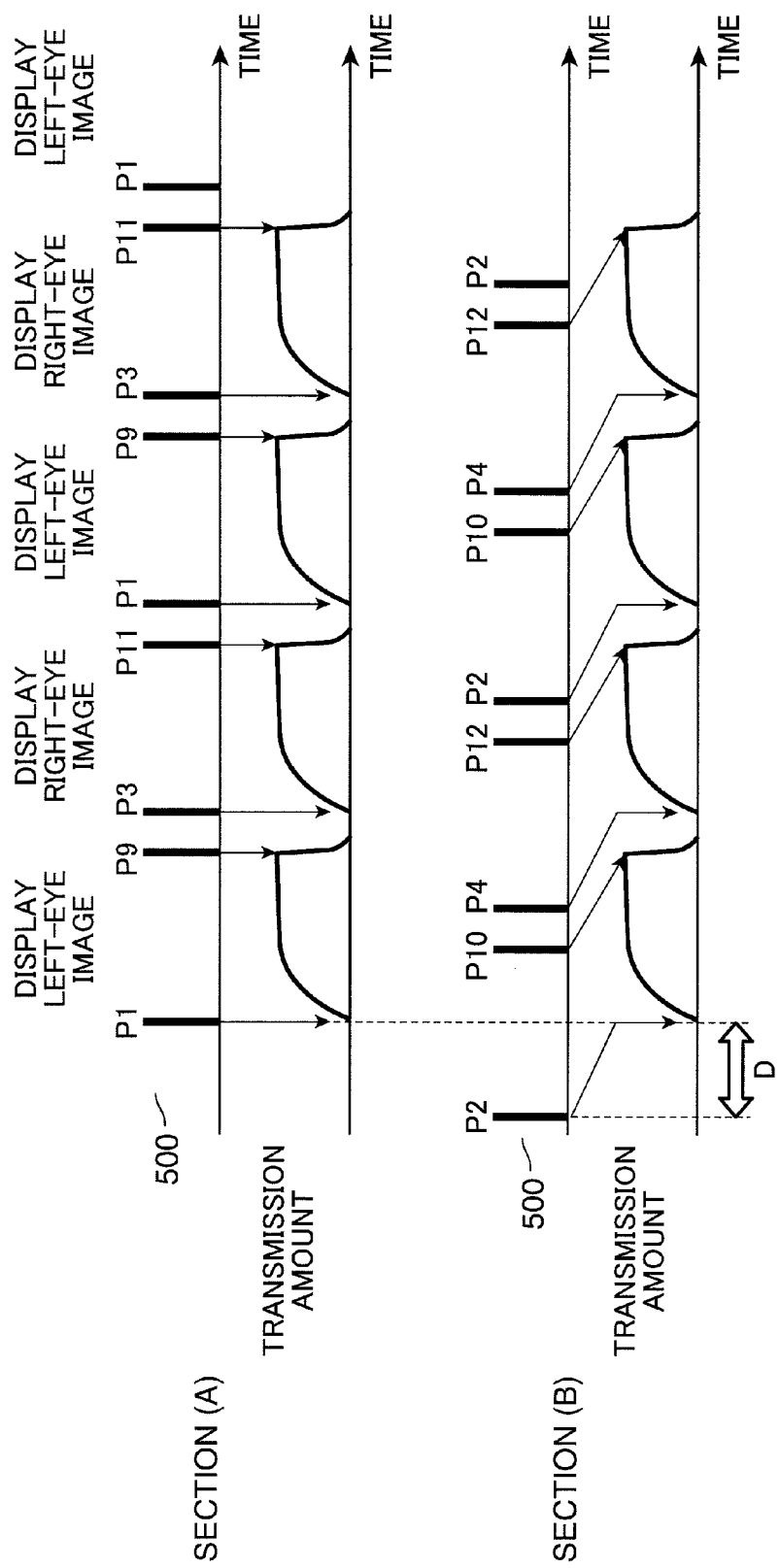
FIG. 16 explains an example of control of the image system shown in FIG. 14.

FIG. 16 shows an example of control in the image system 1 shown in FIG. 14. Section (A) of FIG. 16 shows control for the image viewing eyeglasses 120A while Section (B) of FIG. 16 shows control for the image viewing eyeglasses 120B. The synchronization signal generator 304 of the image display device 100 generates a synchronization signal 500 including the bit series P2 before a left-eye image is displayed, and then sends the synchronization signal 500 to the external synchronization signal receiver 400 of the image viewing eyeglasses 120B. Thereafter, a synchronization signal 500 including the bit series P1 is generated simultaneously with display of the left-eye image, and then the synchronization signal 500 is sent to the external synchronization signal receiver 400 of the image viewing eyeglasses 120A. There is a time interval equal to the control lag time D (the time from detection of the first pulse in the bit series P2, P10, P4 and P12 to action of the left-eye optical filter 121 and/or right-eye optical filter 122) between generation of the synchronization signal 500 comprising the bit series P2 and generation of the synchronization signal 500 comprising the bit series P1. Thus both the viewer wearing the image viewing eyeglasses 120A and the viewer wearing the image viewing eyeglasses 120B may view the image for the left eye displayed by the image display device 100 through the left-eye optical filter 121. Similarly there are time intervals (equal to the control lag time D) between the sets of bit series (P9, P10), (P3, P4), (P11, P12) which are relates to equivalent control each other. Thus operations of the image viewing eyeglasses 120A and 120B may be synchronized. In this embodiment, open/close actions of the optical filter portion 123 in the image viewing eyeglasses 120A and open/close actions of the optical filter portion 123 in the image viewing eyeglasses 120B are all specified by the synchronization signals 500 but the present invention is not limited to these. That is, the synchronization signals 500 for the image viewing eyeglasses 120A do not have to follow a protocol of characteristics. For example, when the image viewing eyeglasses 120A are preexisting glasses, the preexisting 3D glasses receive the transmitted signals with the timing for switching the frames. On the other hand, synchronization signals 500 for the image viewing eyeglasses 120B may receive the synchronization signals at a shifted timing, so that interference with the synchronization signals 500 for the image viewing eyeglasses 120A may be avoided. As a result, preexisting 3D glasses may be still used for image viewing with the image viewing eyeglasses 120B.

Figure 17:
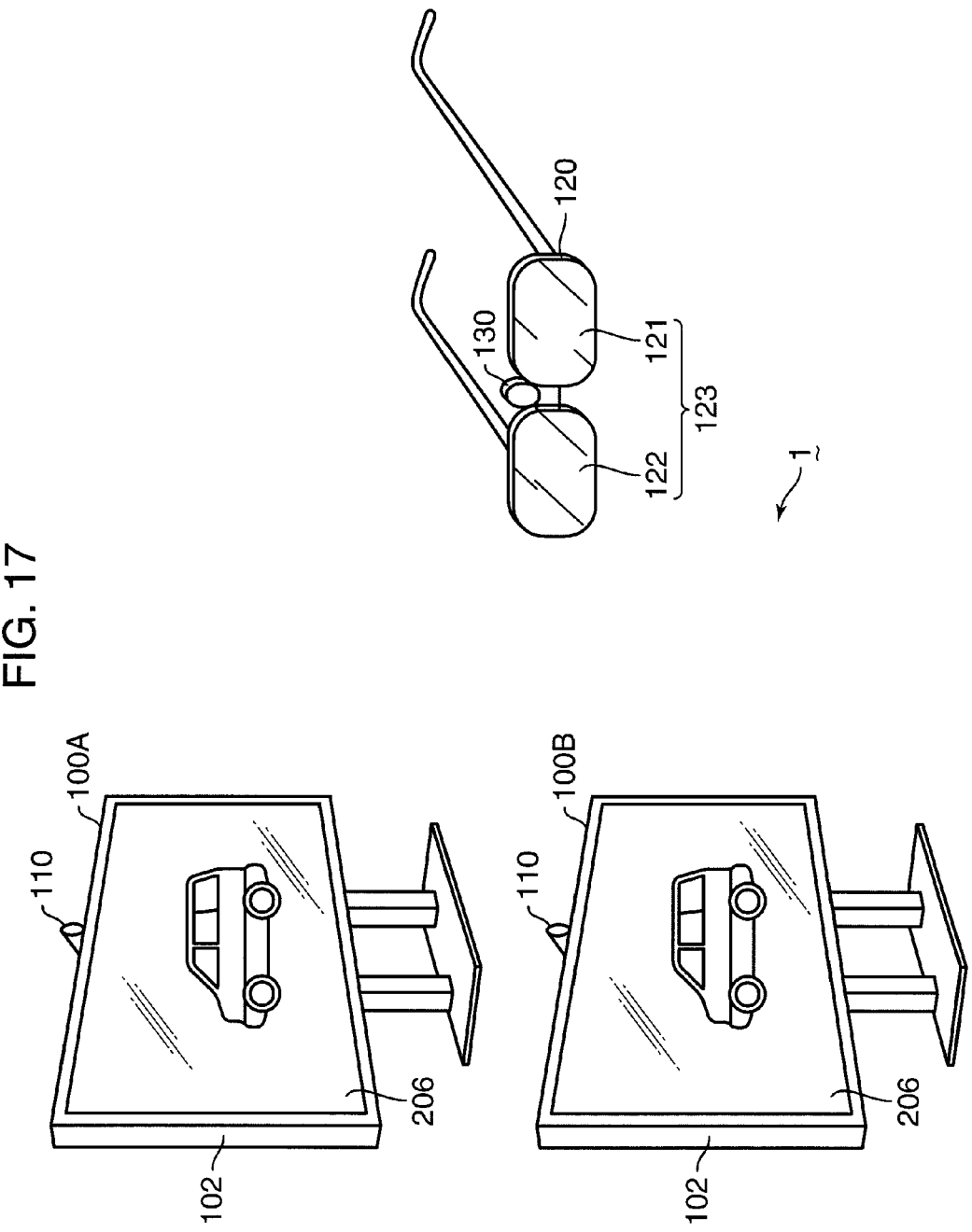
FIG. 17 schematically shows a configuration of an image system comprising a plurality of image display devices and one pair of image viewing eyeglasses according to one embodiment of the invention.

FIG. 17 shows another embodiment of the image system 1. The image system 1 shown in FIG. 17 comprises a plurality of image display devices 100A, 100B and a single pair of image viewing eyeglasses 120. In FIG. 17, two image display devices 100A, 100B are shown, but three or more image display devices 100 may be used.

Figure 18:
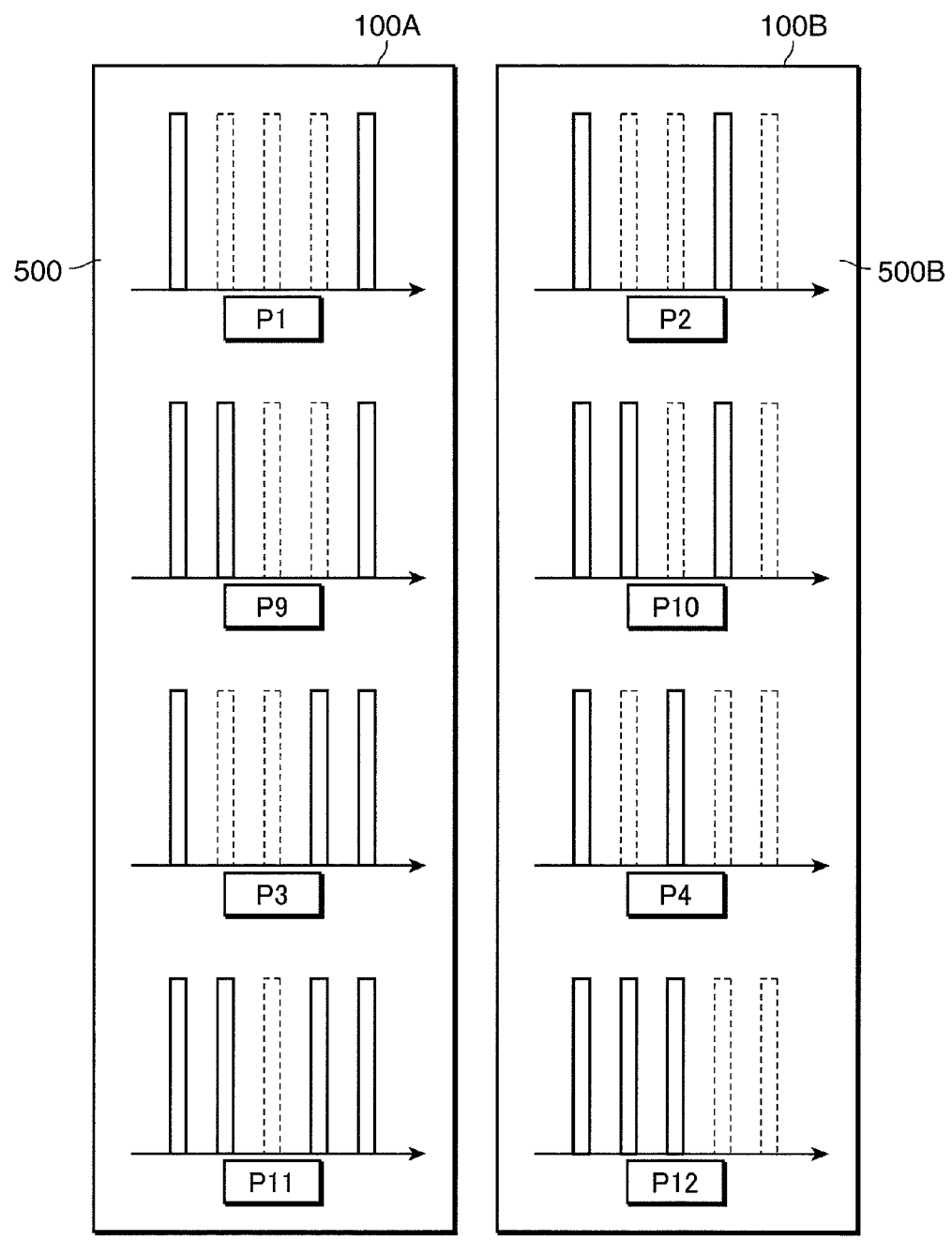
FIG. 18 shows an example of a set of bit series of the synchronization signals transmitted by the image display device shown in FIG. 17.

FIG. 18 shows types of the synchronization signals 500 to be sent from the image display devices 100A and 100B. The synchronization signals 500 comprising the bit series P1, P9, P3, and P11 are the synchronization signals 500 to be transmitted from the image display device 100A. The synchronization signals 500 comprising the bit series P2, P10, P4, and P12 are the synchronization signals to be transmitted from the image display device 100B. These sets of the bit series may be set appropriately via menu selection programs incorporated into the image display devices 100A and 100B.

The synchronization signals 500 with the bit series P1 and P2 are used to perform control to open the left-eye optical filter 121 of the image viewing eyeglasses 120. The synchronization signals 500 with the bit series P9 and P10 are used to perform control to close the left-eye optical filter 121 of the image viewing eyeglasses 120. The synchronization signals 500 with the bit series P3 and P4 are used to perform control to open the right-eye optical filter 122 of the image viewing eyeglasses 120. The synchronization signals 500 with the bit series P11 and P12 are used to perform control to close the right-eye optical filter 122 of the image viewing eyeglasses 120.

Figure 19:
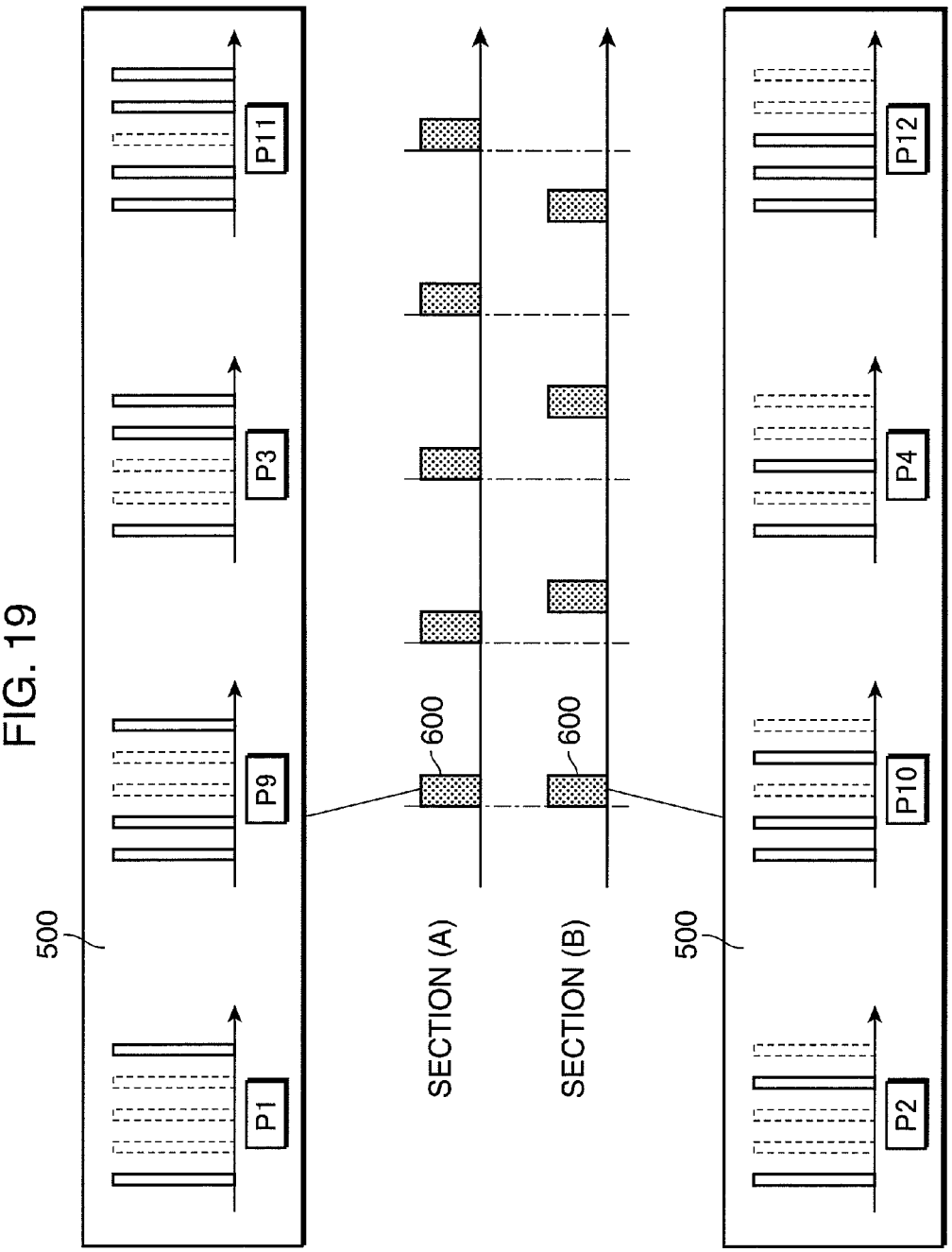
FIG. 19 explains an intermittent transmission pattern of the image display devices shown in FIG. 17.

FIG. 19 shows an example of control in the image system 1 shown in FIG. 17. Section (A) of FIG. 19 shows control of the image display device 100A while Section (B) of FIG. 19 shows control of the image display device 100B. In FIG. 19, the rectangular regions indicated by the symbol 600 represents synchronization signal groups comprising a plurality of the synchronization signals 500 transmitted from the image display devices 100A, 100B. Each of the synchronization signal groups 600 transmitted from the image display device 100A comprises synchronization signals 500 comprising the bit series P1, P9, P3, and P11. Each of the synchronization signal groups 600 transmitted from the image display device 100B comprises synchronization signals 500 comprising the bit series P2, P10, P4, and P12.

The synchronization signal generators 304 of the image display devices 100A, 100B generate the synchronization signals 500 corresponding to image frames, respectively. The transmission controllers 305 of the image display devices 100A, 100B cause the synchronization signal transmitters 306 to transmit a prescribed number of synchronization signals 500 (in the example of FIG. 19, four synchronization signals 500) and then stop the transmission of the synchronization signals 500 for a prescribed interval, respectively, so that synchronization signal groups 600 are formed. After the prescribed interval elapses, the transmission controllers 305 cause the synchronization signal transmitters 306 to repeat the transmission and halting of the synchronization signals 500 with a similar procedure. During the intervals in which the synchronization signals 500 are not transmitted, the internal synchronization signal generator 404 of the image viewing eyeglasses 120 generates internal synchronization signals based on the previously transmitted synchronization signals 500. The optical filter controller 405 controls the optical filter portion 123 based on these internal synchronization signals.

FIG. 19 shows that the transmission controllers 305 cause the synchronization signal transmitters 306 to intermittently transmission of the synchronization signal groups 600 with a constant period. Referring to Section (A) and (B) of FIG. 19, the transmission periods for the synchronization signal groups 600 are different for the image display devices 100A and 100B. Thus the probability of overlap of light emission from the infrared light-emitting elements 207 of the image display devices 100A and 100B may be reduced, so that interference of the synchronization signals 500 between the image display devices 100A and 100B is likely avoided.

The image viewing eyeglasses 120 comprise a switch to select the synchronization signals 500 from one of the image display devices 100A and 100B. When the viewer operates the switch, the synchronization signal analyzer 402 stores only the selected synchronization signals 500 in the synchronization signal storage 403, so that the optical filter portion 123 may be operated in synchronization with the image frames of one of the image display devices 100A and 100B.

Figure 20:
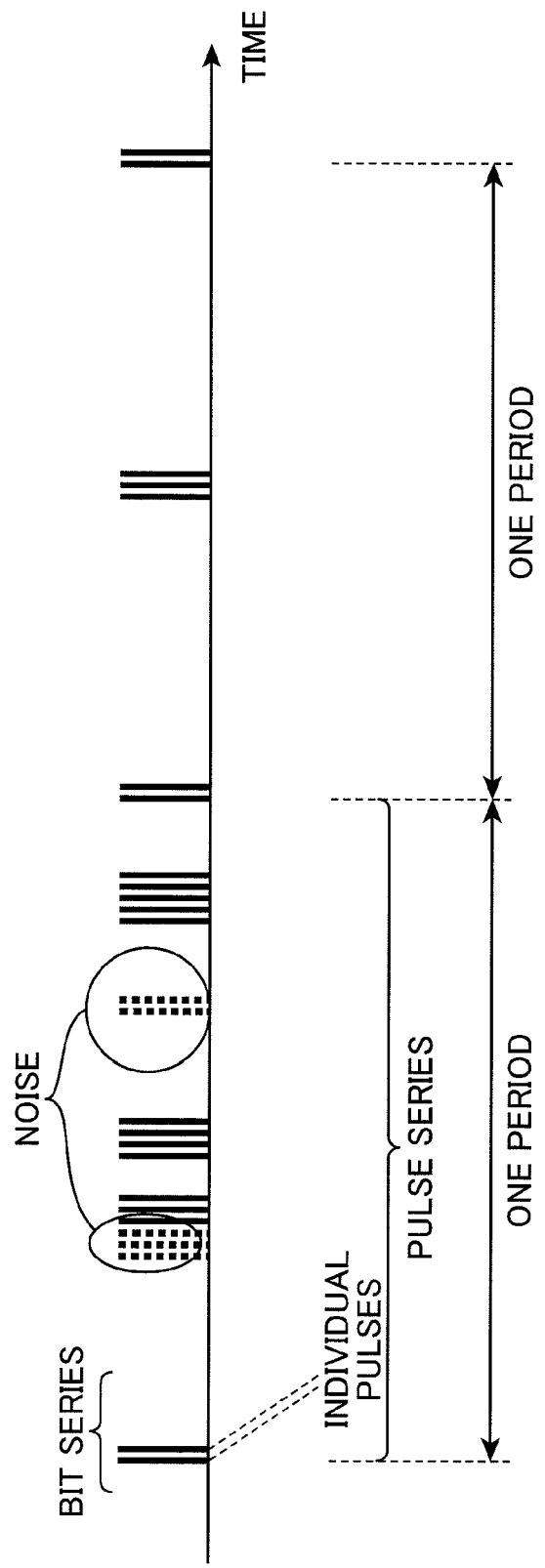
FIG. 20 explains an example of the synchronization signals in which noise signals are intermixed.

FIG. 20 shows an example of the synchronization signals 500 sent from the synchronization signal analyzer 402. In FIG. 20, an interval indicated as "one period" is a time length for displaying an image including one frame for the left eye and one frame for right eye. In FIG. 20, the pulse series comprising a plurality of pulses are shown over each period while noise pulses are also included in addition to the bit series described above in each pulse series. The bit series shown in FIG. 20 is a pulse group including pulses in the time T explained in the context of FIG. 9 from the rising edge of the first bit pulse. In the example shown in FIG. 20, the time from when each frame for the left eye starts to when the synchronization signal generator 304 generates a synchronization signal 500 is constant among left-eye frames. Similarly the time from when each frame for the right eye starts to when the synchronization signal generator 304 generates a synchronization signal 500 is constant among right-eye frames. In each period, the synchronization signal generator 304 generates the same synchronization signal groups 600.

Figure 21:
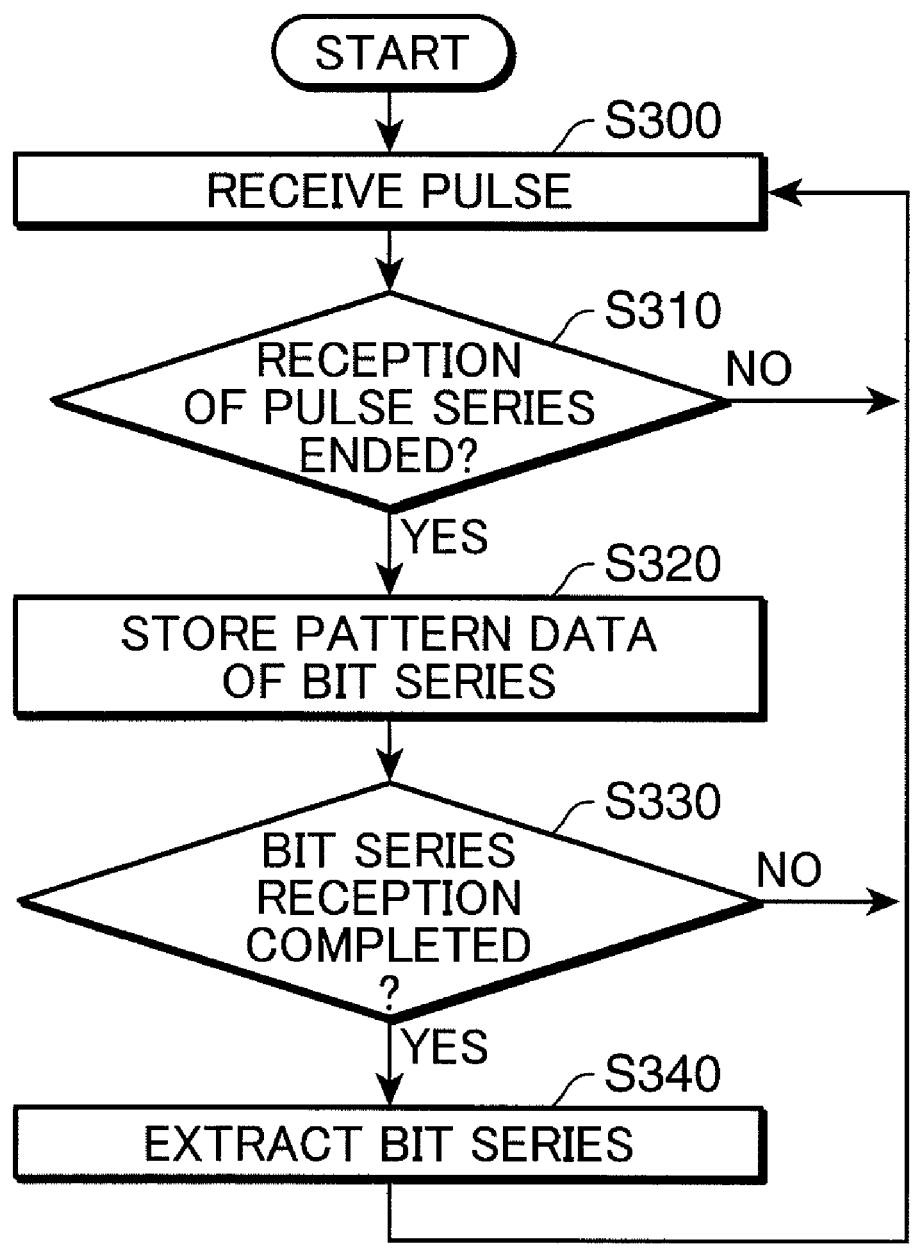
FIG. 21 is a flowchart explaining processes to remove the noise signals shown in FIG. 20.

FIG. 21 is a flowchart explaining a method for detecting the bit series actually generated by the synchronization signal generator 304 from the pulse series including the noise shown in FIG. 20. First, the first pulse is received (S300). Then, pulse reception is continued for one bit series (S310). When reception of pulses for one bit series is completed, the control data 550 for the bit series is generated (S320). In this process S320, information related to the time from the start of the period (or, the start of each frame) until reception of bit series is stored in the memory 221 (the synchronization signal storage 403) together with the control data 550. The method explained in the context of FIG. 9 may be applicable to generation of control data 550. Process S300 to process S320 for one period are executed (S330). Processes for a plurality of periods are executed, and a plurality of control data sets 550 is stored in the synchronization signal storage 403. Then, bit series extraction process is executed (S340).

Figure 22:
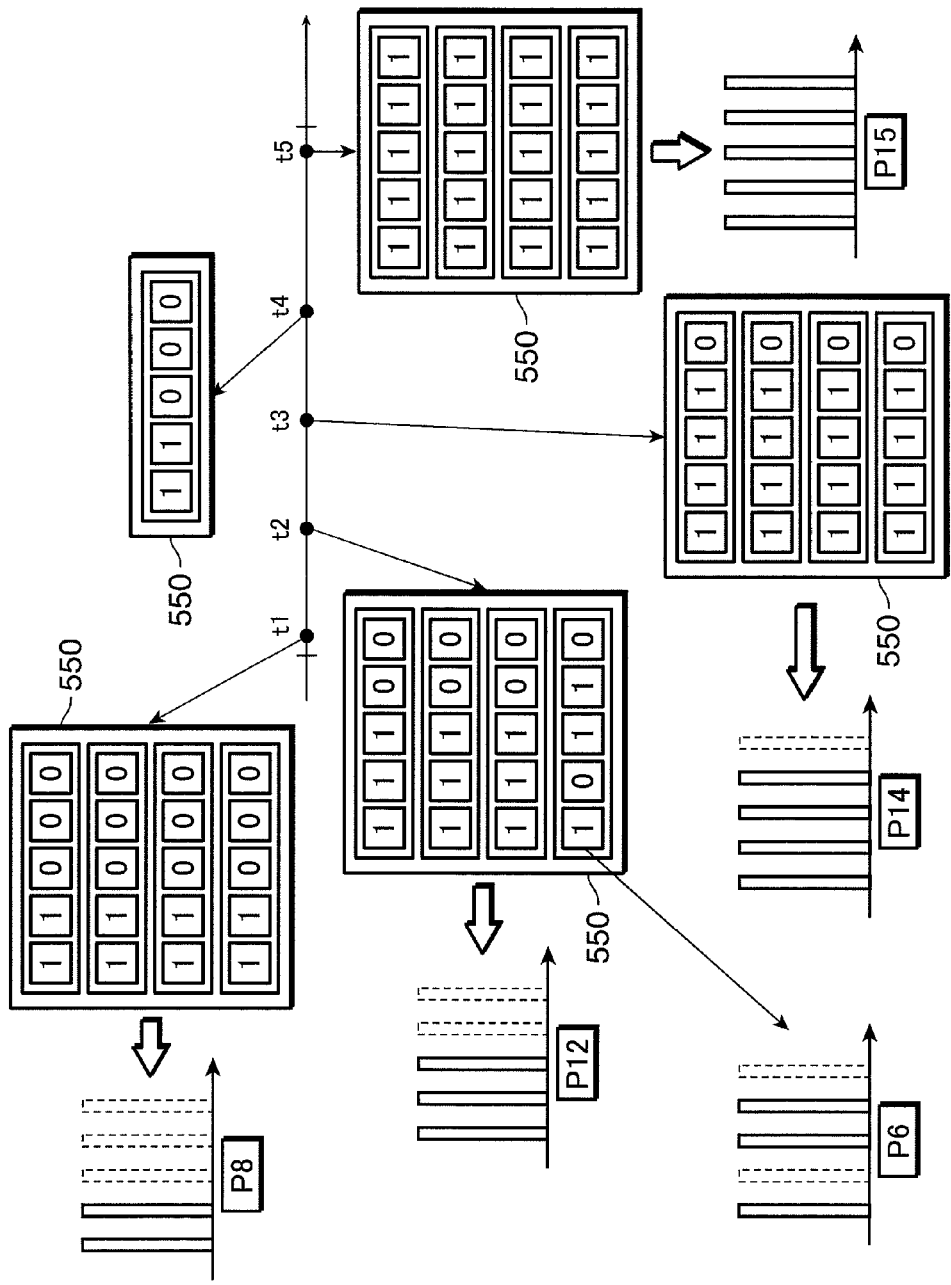
FIG. 22 is a conceptual diagram explaining the bit series extraction process in the flowchart shown in FIG. 21.

FIG. 22 is a conceptual diagram of the bit series extraction process S340 under a condition that the synchronization signal generator 304 may generate only the synchronization signals 500 comprising the bit series P8, P12, P14, and P15. The four control data sets 550 obtained from the bit series at time t1 from the start of the period are all equivalent to the bit series P8. Thus the synchronization signal analyzer 402 extracts the bit series at time t1 as bit series P8. Three control data sets 550 of the four control data sets 550 obtained from the bit series positioned at time t2 are equivalent to the bit series P12 while are equivalent to the bit series P12 which the synchronization signal generator 304 may not generate. Therefore the control data set 550 equivalent to the bit series P6 is eliminated as noise data while the synchronization signal analyzer 402 selects the control data set 550 with highest frequency, so that it extracts the bit series P12 as the bit series positioned at time t2. The threshold value for extraction is set appropriately using, for example, S/N ratio of the communication system and other parameters.

The four control data sets 550 obtained from the bit series at time t3 are all equivalent to the bit series P14, and so the synchronization signal analyzer 402 extracts the bit series at time t3 as the bit series P14. Only one control data set 550 obtained from the bit series at time t4 exists. According to the control shown in FIG. 22, the control data sets 550 may be eliminated as noise data if the synchronization signal analyzer 402 does not recognize three or more of the same control data sets 550 at the same time. Therefore the synchronization signal analyzer 402 determines that the bit series at time t4 should be ignored. The four control data sets 550 obtained from the bit series at time t5 are all equivalent to the bit series P15, and so the synchronization signal analyzer 402 extracts the bit series at time t5 as the bit series P15.

Figure 23:
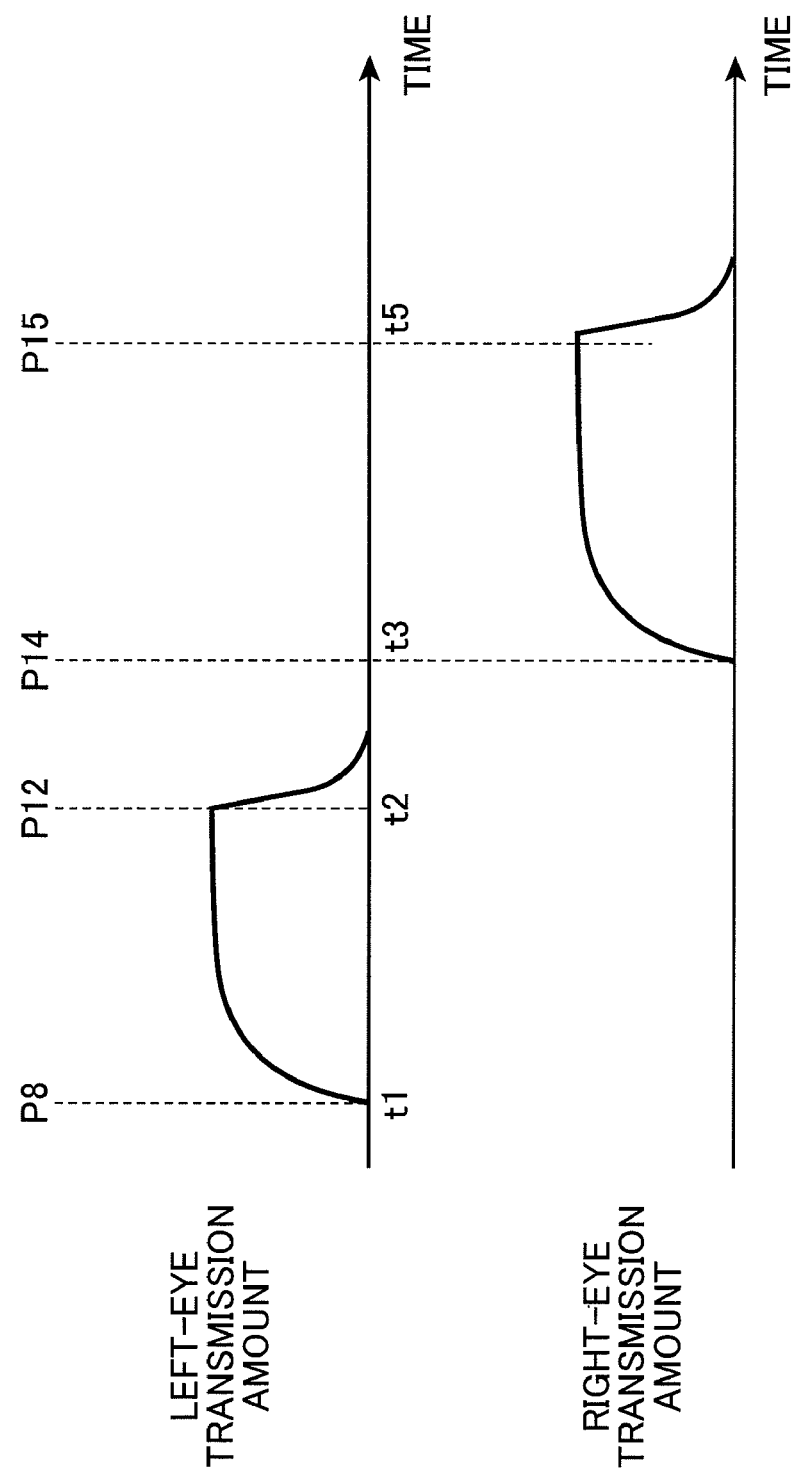
FIG. 23 explains control of the optical filter portion after noise is removed by the bit series extraction process explained in FIG. 22.

FIG. 23 shows an example of control for the optical filter portion 123 based on the bit series obtained through the bit series extraction process S340 shown in FIG. 22. Information on control to open the left-eye optical filter 121 is allocated in advance to the bit series P8. Information on control to close the left-eye optical filter 121 is allocated in advance to the bit series P12. Information on control to open the right-eye optical filter 122 is allocated in advance to the bit series P14. Information on control to close the right-eye optical filter 122 is allocated in advance to the bit series P15. The synchronization signal analyzer 402 stores bit series extracted through the bit series extraction process S340 in the synchronization information storage 403. Based on the bit series stored in the synchronization information storage 403, internal synchronization signals are generated by the internal synchronization signal generator 404. Based on these internal synchronization signals, the optical filter controller 405 may control the optical filter portion 123 without being affected by noise.

The method for noise elimination explained in the contest of FIG. 20 through FIG. 23 may also prevent erroneous operation of the optical filter portion 123. As other methods for stabilizing communication between the image display device 100 and the image viewing eyeglasses 120, the final pulses 505 among the pulses comprising bit series may be used as parity check pulses. In this case, the other pulses 502, 503, 504 excluding the first pulse 501 are used to transmit information to the image viewing eyeglasses 120.

Referring to FIG. 7, the last bit of the bit series serves as a parity bit if a pulse 505 is set so that a sum of the pulses 502, 503, 504, 505 is "1". When the last pulse is used for parity checking, in the bit series shown in FIG. 7, the bit series P1, P2, P4, P7, P11, P13, and P14 are signals transmitted from the synchronization signal transmitter 306.

The above-described specific embodiment mainly comprises the following configuration.

The image system according to one aspect of the above-described embodiment comprises an image display device configured to display image; and image viewing eyeglasses used for viewing the image displayed by the image display device, wherein the image display device includes: a display portion configured to display the image in time series to be viewed using the image viewing eyeglasses; a synchronization signal generator configured to generate a synchronization signal in synchronization with frame of the image, the synchronization signal including prescribed bit series to transmit bit data described by the presence or absence of a pulse; and a synchronization signal transmitter configured to transmit the synchronization signal, and the image viewing eyeglasses include: an optical filter portion configured to adjust an amount of light transmitted to a left eye and a right eye of a viewer; a synchronization signal receiver configured to receive the synchronization signal transmitted from the synchronization signal transmitter; a synchronization signal analyzer configured to detect the bit series, analyze a pattern of the bit series during a predetermined detection time when the synchronization signal analyzer detects the first pulse received by the synchronization signal receiver, and generate control data to control the optical filter portion; and an optical filter controller configured to control the optical filter portion with the control data.

According to the above configuration, the image viewing eyeglasses may be variously operated according to the control data so that the image system may be used in various applications.

In the above configuration, it is preferable that the image viewing eyeglasses further comprise a storage configured to store control information for the optical filter portion, the control information allocated to the control data, and the synchronization signal analyzer compares the synchronization signal with the control information allocated to the control data stored in the storage.

According to the above configuration, the optical filter controller may variously operate the optical filter portion according to the control data.

In the above configuration, it is preferable that the image viewing eyeglasses comprise plural pairs of the image viewing eyeglasses, the synchronization signal transmitter transmits the synchronization signal to the synchronization signal receiver of each pair of image viewing eyeglasses, and the bit series of the synchronization signal received by the synchronization signal receiver of one of the plural pairs of the image viewing eyeglasses are different from the bit series of the synchronization signals received by the synchronization signal receiver of another pair of the image viewing eyeglasses.

According to the above configuration, the image displayed by a single image display device may be viewed by a plurality of viewers without any interference among viewers.

In the above configuration, it is preferable that the image display device comprises a plurality of the image display devices, the synchronization signal generators of the plurality of the image display devices generate the synchronization signals with mutually different bit series, respectively, and the image viewing eyeglasses further comprise a switch configured to switch control by the optical filter controller from control based on the control data generated from the synchronization signal transmitted by one of the plurality of the image display devices to control based on the control data generated from the synchronization signal transmitted from another image display device.

According to the above configuration, the images displayed by a plurality of image display devices may be viewed through a single pair of image viewing eyeglasses without interference when the viewer operate the switch to select one of the plurality of the image display devices which displays the image the viewer desires to watch.

In the above configuration, it is preferable that each of the plurality of the image display devices further comprises a transmission controller configured to control the synchronization signal transmitter so that the synchronization signal transmitter intermittently transmits synchronization signal groups comprising a plurality of the synchronization signals, and the transmission controller in one of the plurality of the image display devices controls the synchronization signal transmitter so as to transmit the synchronization signal groups with a period different from a transmission period of the synchronization signal groups from the another image display device.

According to the above configuration, signal interference among the plurality of the image display devices may be avoided so that better communication between image display devices and the image viewing eyeglasses may be established. Further, shorter emission of the infrared light may allow a larger current to the infrared LEDs or other light-emitting elements, so that the infrared rays may be transmitted over large distances.

In the above configuration, it is preferable that the optical filter portion comprises a left-eye optical filter configured to adjust the amount of the light transmitted to the left eye of the viewer and a right-eye optical filter configured to adjust the amount of the light transmitted to the right eye of the viewer, the image includes left-eye frames configured to be viewed by the left eye of the viewer and right-eye frames configured to be viewed by the right eye of the viewer, the synchronization signal generator generates a plurality of the synchronization signals with different bit series for the left-eye frames and the right-eye frames, the synchronization signal analyzer generates one control data set from one of the plurality of synchronization signals and other control data sets from other synchronization signals, and the optical filter controller causes one of the left-eye optical filter and the right-eye optical filter to adjust the amount of the light based on the one control data set and causes another to adjust the amount of the light based on the other control data sets.

According to the above configuration, the left-eye optical filter and the right-eye optical filter are controlled in synchronization with the left-eye frames and to the right-eye frames, respectively, based on different control data sets, so that the control for the left-eye optical filter and the right-eye optical filter may be adjustable with the characteristics of the left-eye frames and the right-eye frames.

In the above configuration, it is preferable that the image includes the left-eye frame and the right-eye frame, and the optical filter controller causes the one of the left-eye optical filter and the right-eye optical filter to reduce the amount of the light based on the one control data set before the image is switched from the one of the left-eye frame and the right-eye frame to another.

According to the above configuration, afterglow from the images of a precedent frame may not likely affect the viewer viewing subsequent frame.

In the above configuration, it is preferable that there is a difference in a content between the left-eye frame and the right-eye frame by an amount of parallax, and the bit series include data relating to the amount of the parallax.

According to the above configuration, the optical filter portion may be variously operated according to the amount of the parallax.

In the above configuration, it is preferable that the image includes the left-eye frame and the right-eye frame, the synchronization signal generator generates the synchronization signals with an equivalent period to a period for switching between the left-eye frame and the right-eye frame, the image viewing eyeglasses comprise an internal synchronization signal generator configured to generate internal synchronization signals based on the synchronization signals, the optical filter controller controls the optical filter portion using the control data based on the internal synchronization signals, and the synchronization signal analyzer shuts off power supply to at least one among the synchronization signal receiver, a synchronization signal detector configured to detect the synchronization signals received by the synchronization signal receiver as electrical signals, the synchronization signal analyzer and the storage while the image viewing eyeglasses do no receive the synchronization signals.

According to the above configuration, the time for power supply to circuitry for receiving synchronization signal may be shortened.

In the above configuration, it is preferable that the image comprises a plurality of left-eye frames configured to be viewed by the left eye of the viewer and a plurality of right-eye frames configured to be viewed by the right eye of the viewer, and the synchronization signal analyzer causes the storage to store a time interval between receptions of the respective bit series of the plurality of the left-eye frames and the plurality of the right-eye frames as well as the control data, and compares the control data with the time interval between the reception of the bit series per the left-eye frame and per the right-eye frame.

According to the above configuration, the pulses of synchronization signals generated by the synchronization signal generator may be distinguished from noise pulses, so that noise and actual synchronization signals can be distinguished without transmitting a starting or ending signal such as a leader and a trailer.

In the above configuration, it is preferable that the synchronization signal analyzer eliminates the bit series other than the prescribed bit series as a noise.

According to the above configuration, signals with patterns other than prescribed patterns are eliminated as noise, so that the image viewing eyeglasses may not be erroneously operated.

In the above configuration, it is preferable that the synchronization signal analyzer eliminates one control data set as noise data if a number of the control data sets equivalent to the one control data set is no more than a prescribed number at a time when the one control data set is obtained.

According to the above configuration, noise may be reliably eliminated.

In the above configuration, it is preferable that the bit series comprise the pulse for checking an error in transmission and reception between the image display device and the image viewing eyeglasses.

According to the above configuration, errors in transmission and reception between the image display device and the image viewing eyeglasses may be checked to achieve stable transmission and reception.

In the above configuration, it is preferable that the bit series comprise information relating to timing for adjusting the amount of the light by the optical filter portion.

According to the above configuration, the timing for opening and closing the optical filter portion may be desirably controlled. Therefore the image viewing eyeglasses may be controlled just using the synchronization signals generated by the synchronization signal generator.

The image display device of another aspect of the above-described embodiment comprises a display configured to display the image in time series to be viewed using an image viewing eyeglasses; a synchronization signal generator configured to generate a synchronization signal in synchronization with frame of the image, the synchronization signal including prescribed bit series to transmit bit data described by the presence or absence of a pulse; and a synchronization signal transmitter configured to transmit the synchronization signal According to the above configuration, information described by the bit series may be transmitted to an external device.

The image viewing eyeglasses of another aspect of the above-described embodiment comprises an optical filter portion configured to adjust an amount of light transmitted to a left eye and a right eye of a viewer; a synchronization signal receiver configured to receive a synchronization signal externally transmitted, the synchronization signal including prescribed bit series to transmit bit data described by the presence or absence of a pulse; a synchronization signal analyzer configured to detect the bit series, analyze a pattern of the bit series during a predetermined detection time when the synchronization signal analyzer detects the first pulse received by the synchronization signal receiver, and generate control data to control the optical filter portion; and an optical filter controller configured to control the optical filter portion with the control data.

According to the above configuration, the optical filter portion may be controlled according to the bit series.

This application is based on U.S. Provisional Application No. 61/220,897, filed on Jun. 26, 2009, and Japanese Patent Application No. 2009-157937 filed on Jul. 2, 2009, the contents of which are hereby incorporated by reference.

The specific embodiments or practical examples described in the detailed explanation of the invention merely clarify the technical nature of the invention, which should not be understood as narrowly limited to such specific examples. Various modifications can be made within the spirit of the invention and within the scope of the claims described herebelow.

What is claimed is:

1. An image system, comprising:
an image display device configured to display image; and
image viewing eyeglasses used for viewing the image displayed by the image display device, wherein the image display device includes:
a display portion configured to display the image in time series to be viewed using the image viewing eyeglasses;
a synchronization signal generator configured to generate a synchronization signal in synchronization with frame of the image, the synchronization signal including prescribed bit series to transmit bit data described by the presence or absence of a pulse; and
a synchronization signal transmitter configured to transmit the synchronization signal, and the image viewing eyeglasses include:
an optical filter portion configured to adjust an amount of light transmitted to a left eye and/or a right eye of a viewer;
a synchronization signal receiver configured to receive the synchronization signal transmitted from the synchronization signal transmitter;
a synchronization signal analyzer configured to detect the bit series, analyze a pattern of the bit series during a predetermined detection time when the synchronization signal analyzer detects a first pulse received by the synchronization signal receiver, and generate control data to control the optical filter portion; and
an optical filter controller configured to control the optical filter portion with the control data,
wherein the image viewing eyeglasses comprise plural pairs of the image viewing eyeglasses, the synchronization signal transmitter transmits the synchronization signal to the synchronization signal receiver of each pair of image viewing eyeglasses, and the bit series of the synchronization signal received by the synchronization signal receiver of one of the plural pairs of the image viewing eyeglasses are different from the bit series of the synchronization signals received by the synchronization signal receiver of another pair of the image viewing eyeglasses.

2. The image system according to claim 1, wherein the image viewing eyeglasses further comprise a storage configured to store control information for the optical filter portion, the control information allocated to the control data, and
the synchronization signal analyzer compares the synchronization signal with the control information allocated to the control data stored in the storage.

3. The image system according to claim 2, wherein the image includes the left-eye frame and the right-eye frame,
the synchronization signal generator generates the synchronization signals with an equivalent period to a period for switching between the left-eye frame and the right-eye frame,
the image viewing eyeglasses comprise an internal synchronization signal generator configured to generate internal synchronization signals based on the synchronization signals,
the optical filter controller controls the optical filter portion using the control data based on the internal synchronization signals, and
the synchronization signal analyzer shuts off power supply to at least one among the synchronization signal receiver, a synchronization signal detector configured to detect the synchronization signals received by the synchronization signal receiver as electrical signals, the synchronization signal analyzer and the storage while the image viewing eyeglasses do no receive the synchronization signals.

4. The image system according to claim 3, wherein the synchronization signal analyzer eliminates the bit series other than the prescribed bit series as a noise.

5. The image system according to claim 2, wherein the image comprises a plurality of left-eye frames configured to be viewed by the left eye of the viewer and a plurality of right-eye frames configured to be viewed by the right eye of the viewer, and
the synchronization signal analyzer causes the storage to store a time interval between receptions of the respective bit series of the plurality of the left-eye frames and the plurality of the right-eye frames as well as the control data, and compares the control data with the time interval between the reception of the bit series per the left-eye frame and per the right-eye frame.

6. The image system according to claim 5, wherein the synchronization signal analyzer eliminates one control data set as noise data if a number of the control data sets equivalent to the one control data set is no more than a prescribed number at a time when the one control data set is obtained.

7. The image system according to claim 1, wherein the image display device comprises a plurality of the image display devices,
the synchronization signal generators of the plurality of the image display devices generate the synchronization signals with mutually different bit series, respectively, and
the image viewing eyeglasses further comprise a switch configured to switch control by the optical filter controller from control based on the control data generated from the synchronization signal transmitted by one of the plurality of the image display devices to control based on the control data generated from the synchronization signal transmitted from another image display device.

8. The image system according to claim 7, wherein each of the plurality of the image display devices further comprises a transmission controller configured to control the synchronization signal transmitter so that the synchronization signal transmitter intermittently transmits synchronization signal groups including a plurality of the synchronization signals, and
the transmission controller in one of the plurality of the image display devices controls the synchronization signal transmitter so as to transmit the synchronization signal group with a period different from a transmission period of the synchronization signal group from another image display device.

9. The image system according to claim 1, wherein
the optical filter portion comprises a left-eye optical filter configured to adjust the amount of the light transmitted to the left eye of the viewer and a right-eye optical filter configured to adjust the amount of the light transmitted to the right eye of the viewer,
the image includes left-eye frames configured to be viewed by the left eye of the viewer and right-eye frames configured to be viewed by the right eye of the viewer,
the synchronization signal generator generates a plurality of the synchronization signals with different bit series for the left-eye frames and the right-eye frames,
the synchronization signal analyzer generates one control data set from one of the plurality of synchronization signals and other control data sets from other synchronization signals, and
the optical filter controller causes one of the left-eye optical filter and the right-eye optical filter to adjust the amount of the light based on the one control data set and causes another to adjust the amount of the light based on the other control data sets.

10. The image system according to claim 9, wherein the image includes the left-eye frame and the right-eye frame, and
the optical filter controller causes the one of the left-eye optical filter and the right-eye optical filter to reduce the amount of the light based on the one control data set before the image is switched from the one of the left-eye frame and the right-eye frame to another.

11. The image system according to claim 9, wherein there is a difference in a content between the left-eye frame and the right-eye frame by an amount of parallax, and
the bit series include data relating to the amount of the parallax.

12. The image system according to claim 1, wherein the bit series comprise the pulse for checking an error in transmission and reception between the image display device and the image viewing eyeglasses.

13. The image system according to claim 1, wherein the bit series comprise information relating to timing for adjusting the amount of the light by the optical filter portion.

14. An image display device, comprising:
a display portion configured to display the image in time series to be viewed using an image viewing eyeglasses;
a synchronization signal generator configured to generate a synchronization signal in synchronization with frame of the image, the synchronization signal including prescribed bit series to transmit bit data described by the presence or absence of a pulse; and
a synchronization signal transmitter configured to transmit the synchronization signal, wherein the image display device comprises a plurality of the image display devices, the synchronization signal generators of the plurality of the image display devices generate the synchronization signals with mutually different bit series, respectively, and the image viewing eyeglasses further comprise a switch configured to switch control by the optical filter controller from control based on the control data generated from the synchronization signal transmitted by one of the plurality of the image display devices to control based on the control data generated from the synchronization signal transmitted from another image display device.

15. An image viewing eyeglasses, comprising:
an optical filter portion configured to adjust an amount of light transmitted to a left eye and a right eye of a viewer;
a synchronization signal receiver configured to receive a synchronization signal externally transmitted, the synchronization signal including prescribed bit series to transmit bit data described by the presence or absence of a pulse;
a synchronization signal analyzer configured to detect the bit series, analyze a pattern of the bit series during a predetermined detection time when the synchronization signal analyzer detects the first pulse received by the synchronization signal receiver, and generate control data to control the optical filter portion; and
an optical filter controller configured to control the optical filter portion with the control data,
wherein the image viewing eyeglasses comprise plural pairs of the image viewing eyeglasses, the synchronization signal transmitter transmits the synchronization signal to the synchronization signal receiver of each pair of image viewing eyeglasses, and the bit series of the synchronization signal received by the synchronization signal receiver of one of the plural pairs of the image viewing eyeglasses are different from the bit series of the synchronization signals received by the synchronization signal receiver of another pair of the image viewing eyeglasses.

* * * * *